United States Patent
Brandt et al.

(10) Patent No.: US 12,551,421 B2
(45) Date of Patent: Feb. 17, 2026

(54) N-HEPTYL-GLYCERYL ETHER AND SYNERGISTICALLY ACTIVE PRESERVATIVES

(71) Applicant: Evonik Operations GmbH, Essen (DE)

(72) Inventors: Kathrin Daniela Brandt, Duesseldorf (DE); Jan Jänichen, Hamburg (DE); Michael Kinder, Neuenkirchen (DE); Alexander Thiemann, Hasloh (DE); Ellen Schmitt, Hamburg (DE); Jessica Scholze, Stelle (DE); Sabine Steinmetzer, Wiesbaden (DE)

(73) Assignee: Evonik Operations GmbH, Essen (DE)

( * ) Notice: Subject to any disclaimer, the term of this patent is extended or adjusted under 35 U.S.C. 154(b) by 320 days.

(21) Appl. No.: 18/257,865

(22) PCT Filed: Dec. 13, 2021

(86) PCT No.: PCT/EP2021/085425
§ 371 (c)(1),
(2) Date: Jun. 15, 2023

(87) PCT Pub. No.: WO2022/128882
PCT Pub. Date: Jun. 23, 2022

(65) Prior Publication Data
US 2024/0082123 A1    Mar. 14, 2024

(30) Foreign Application Priority Data
Dec. 17, 2020 (EP) .................... 20214820

(51) Int. Cl.
| A61K 8/33 | (2006.01) |
| A61K 8/02 | (2006.01) |
| A61K 8/34 | (2006.01) |
| A61K 8/36 | (2006.01) |
| A61K 8/365 | (2006.01) |
| A61K 8/368 | (2006.01) |
| A61K 8/49 | (2006.01) |
| A61K 8/67 | (2006.01) |
| A61Q 15/00 | (2006.01) |

(52) U.S. Cl.
CPC .............. *A61K 8/33* (2013.01); *A61K 8/0291* (2013.01); *A61K 8/34* (2013.01); *A61K 8/345* (2013.01); *A61K 8/36* (2013.01); *A61K 8/365* (2013.01); *A61K 8/368* (2013.01); *A61K 8/498* (2013.01); *A61K 8/678* (2013.01); *A61Q 15/00* (2013.01); *A61K 2800/524* (2013.01)

(58) Field of Classification Search
CPC .......... A61K 8/33; A61K 8/0291; A61K 8/34; A61K 8/345; A61K 8/36; A61K 8/365; A61K 8/368; A61K 8/498; A61K 8/678; A61K 2800/524; A61Q 15/00; A61Q 17/005; A01N 25/04; A01N 31/02; A01N 31/04; A01N 37/06
See application file for complete search history.

(56) References Cited

U.S. PATENT DOCUMENTS

| 5,736,574 | A | 4/1998 | Burnier et al. |
| 7,416,722 | B2 | 8/2008 | Straetmans et al. |
| 7,728,168 | B2 | 6/2010 | Jänichen et al. |
| 2006/0229291 | A1 | 10/2006 | Straetmans et al. |
| 2009/0131712 | A1 | 5/2009 | Janichen et al. |
| 2019/0254942 | A1 | 8/2019 | Jänichen et al. |

FOREIGN PATENT DOCUMENTS

| EP | 0 747 047 | | 12/1996 |
| EP | 1 369 471 | | 12/2003 |
| EP | 2807925 | * | 3/2014 |
| EP | 2774481 | * | 6/2018 |
| WO | 2014/191258 | | 12/2014 |
| WO | WO2018033406 | * | 2/2018 |

OTHER PUBLICATIONS

U.S. Pat. No. 7,416,722, filed Aug. 26, 2008, 2006/0229291, Straetmans et al.
U.S. Pat. No. 7,728,168, filed Jun. 1, 2010, 2009/0131712, Janichen et al.
U.S. Appl. No. 16/301,484, filed Nov. 14, 2018, 2019/0254942, Jänichen et al.
Extended European Search Report issued Jun. 22, 2021, received in European Patent Application No. 20214820.1, 7 pages.
International Search Report Issued Apr. 7, 2022, in PCT/EP2021/085425, 5 pages.
Karlheinz Schrader, "Grundlagen und Rezepturen der Kosmetika [Cosmetics—fundamentals and formulations]", 2nd edition, 1989, pp. 329 to 341, Hüthig Buch Verlag Heidelberg.
Written Opinion issued Apr. 7, 2022, in PCT/EP2021/085425, 8 pages.

\* cited by examiner

*Primary Examiner* — Robert A Wax
*Assistant Examiner* — Kimberly Barber
(74) *Attorney, Agent, or Firm* — Grüneberg and Myers PLLC

(57) ABSTRACT

A composition contains n-heptyl-glyceryl ether and at least one further carefully chosen and synergistically active preservative.

20 Claims, 26 Drawing Sheets

Figure 1: Synergistic antimicrobial activity of n-heptyl glyceryl ether and p-anisic acid against A. brasiliensis *)
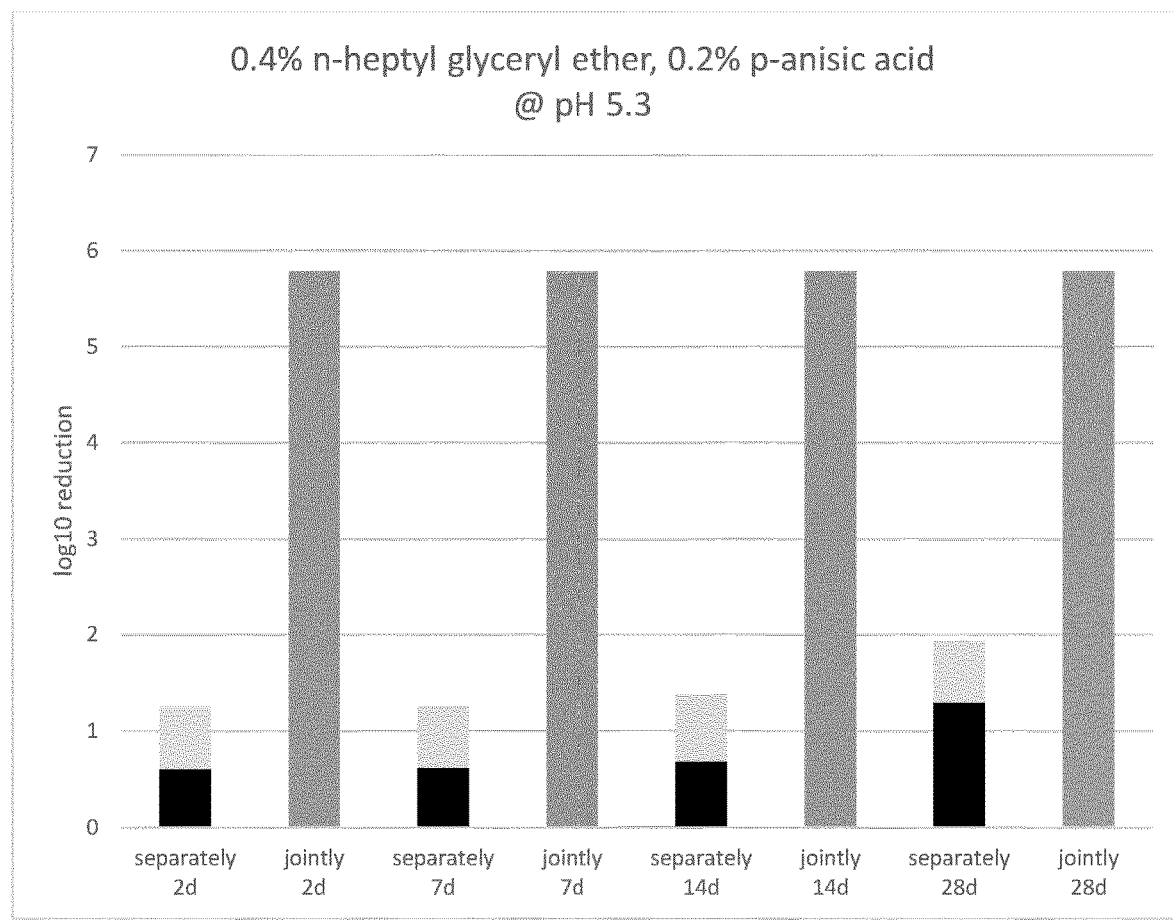
*) example according to the invention Figure 2: *Synergistic antimicrobial activity of n-heptyl glyceryl ether and p-anisic acid against* A. brasiliensis *\*)*
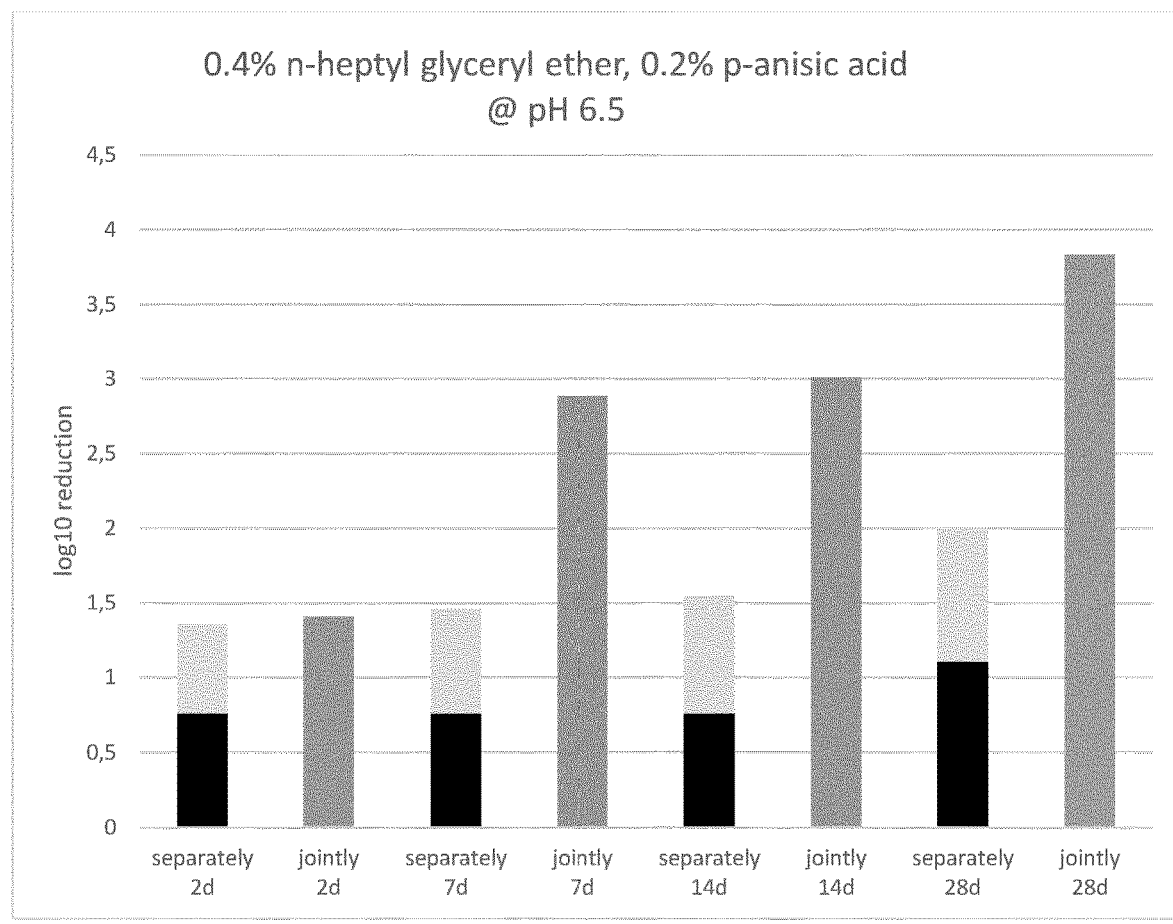
*) example according to the invention Figure 3: Synergistic antimicrobial activity of n-heptyl glyceryl ether and p-anisic acid against A. brasiliensis at different pH values *)
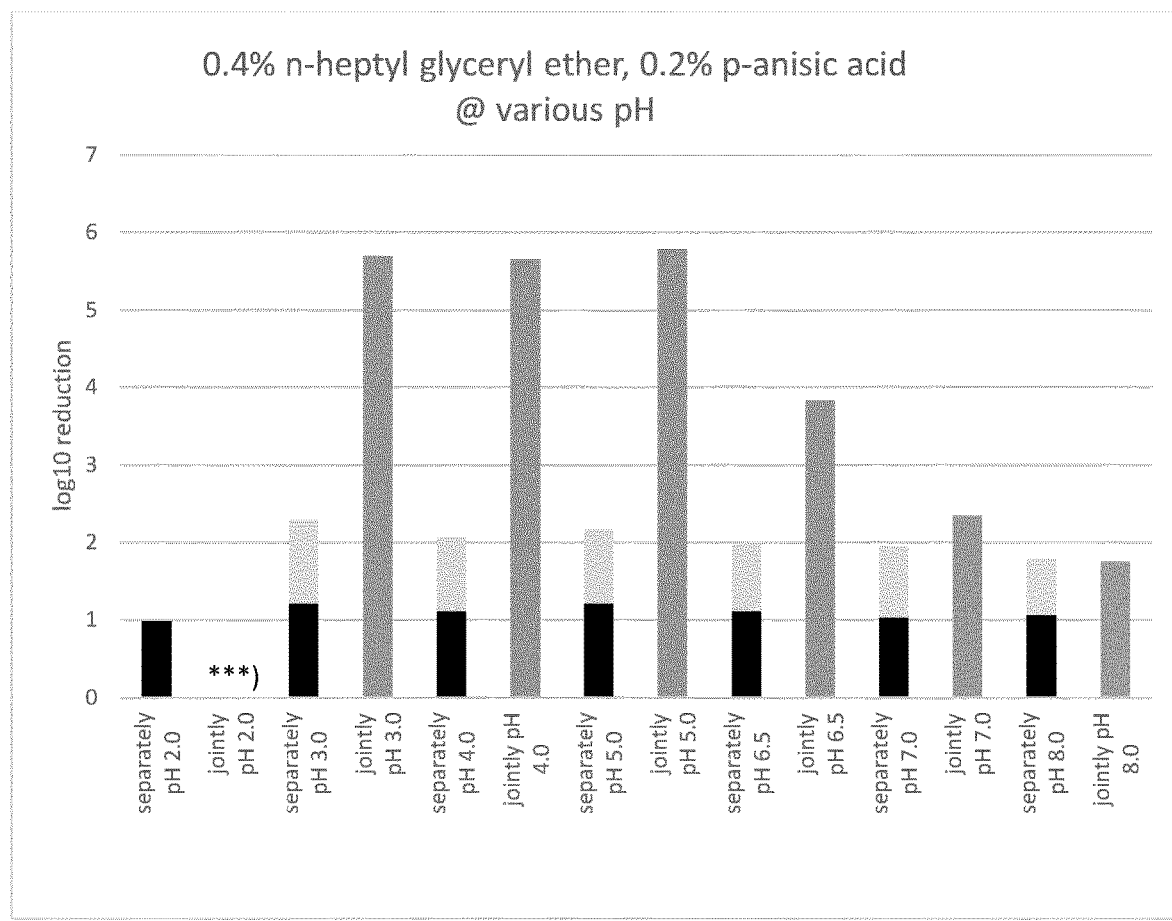
*) example according to the invention; *) formulation not stable / separation Figure 4: Synergistic antimicrobial activity of n-heptyl glyceryl ether and sorbic acid against A. brasiliensis** *)
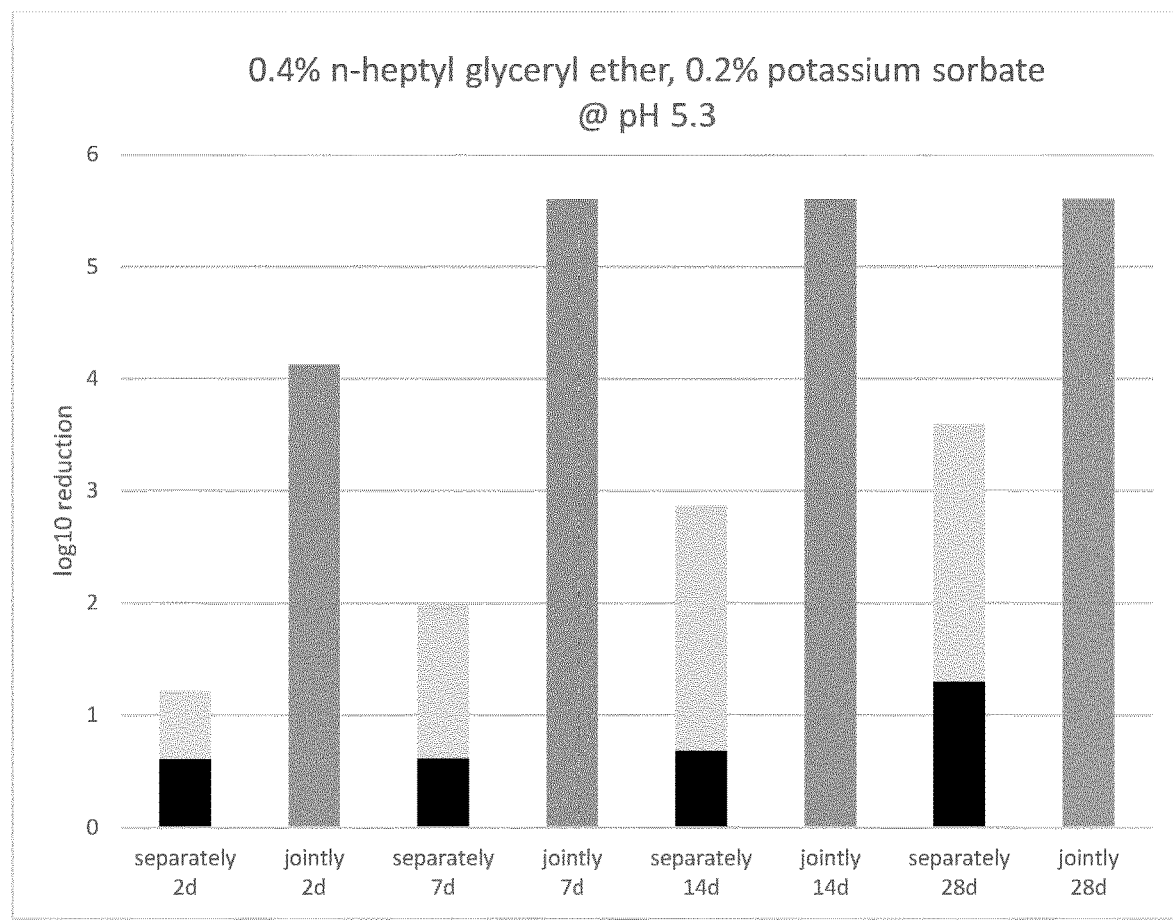
*) example according to the invention Figure 5: *Synergistic antimicrobial activity of n-heptyl glyceryl ether and sorbic acid against* A. brasiliensis *)
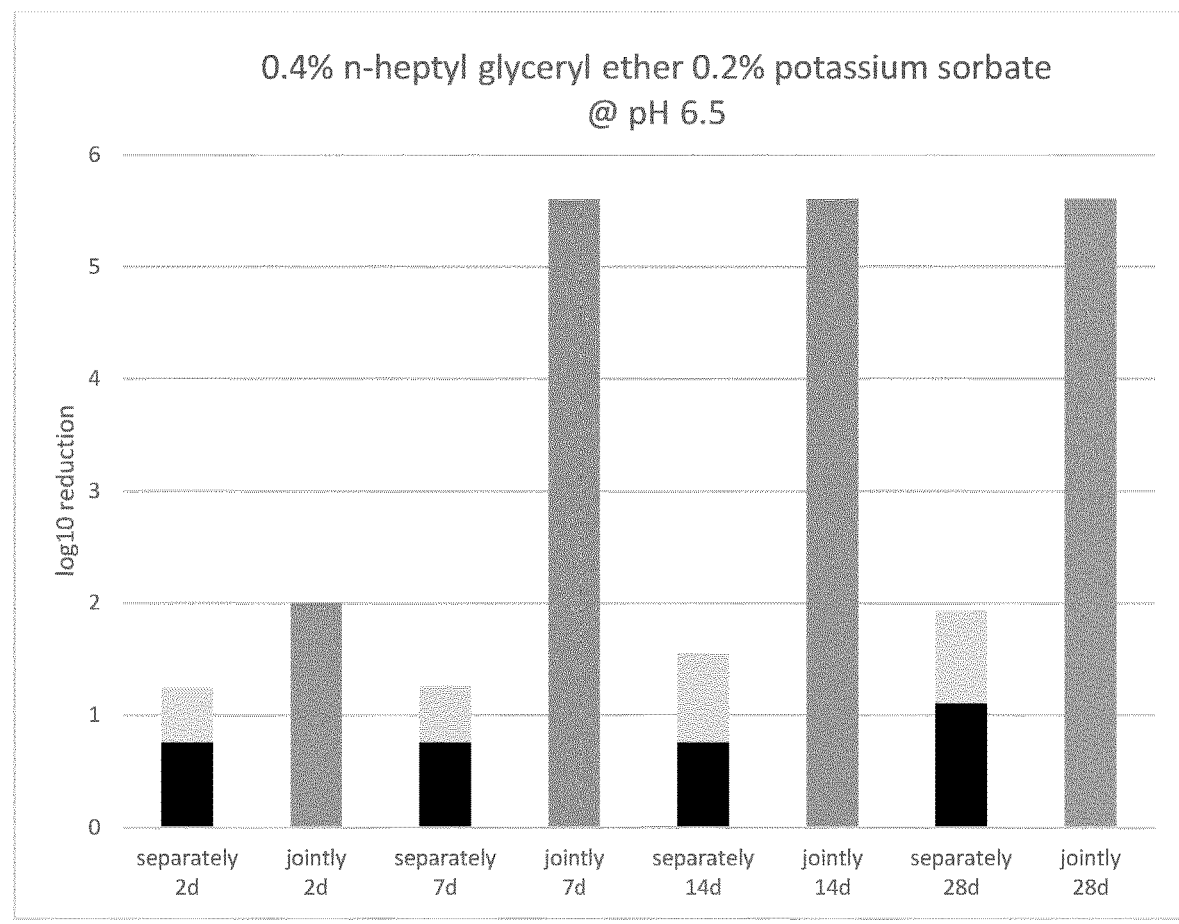
*) example according to the invention Figure 6: Synergistic antimicrobial activity of n-heptyl glyceryl ether and phenyl propanol against *A. brasiliensis* *)
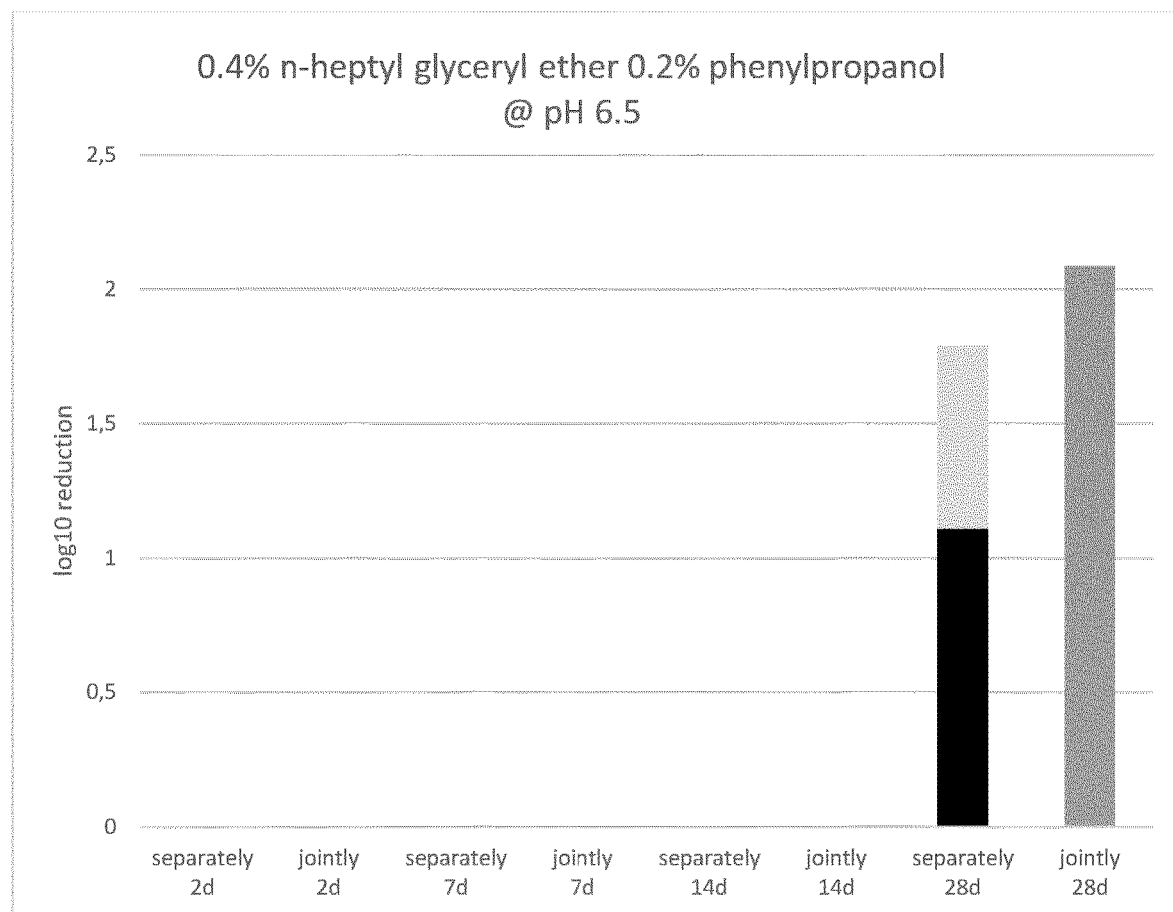
*) example according to the invention Figure 7: Synergistic antimicrobial activity of n-heptyl glyceryl ether and lactic acid against A. brasiliensis *)
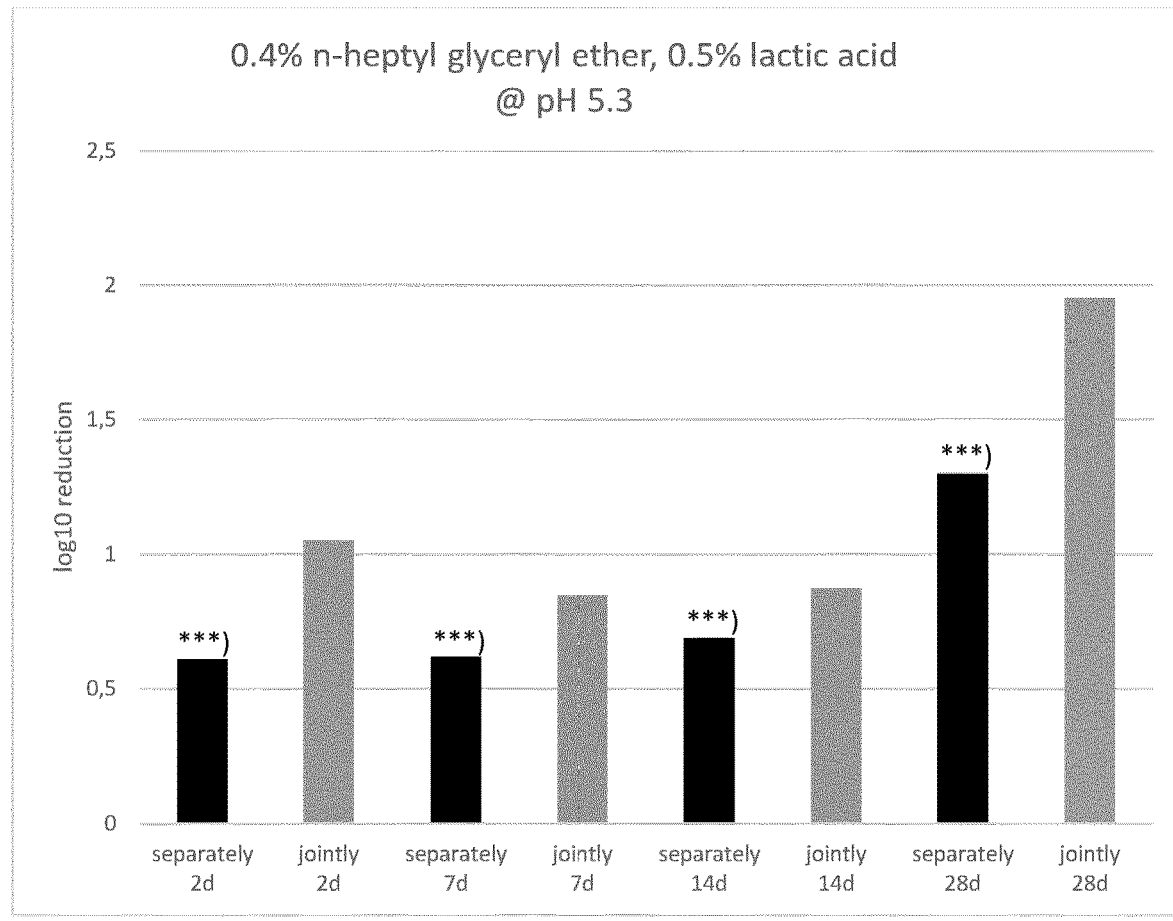
*) example according to the invention
*) no log reduction for lactic acid separately Figure 8: Synergistic antimicrobial activity of n-heptyl glyceryl ether and lactic acid against A. brasiliensis** *)
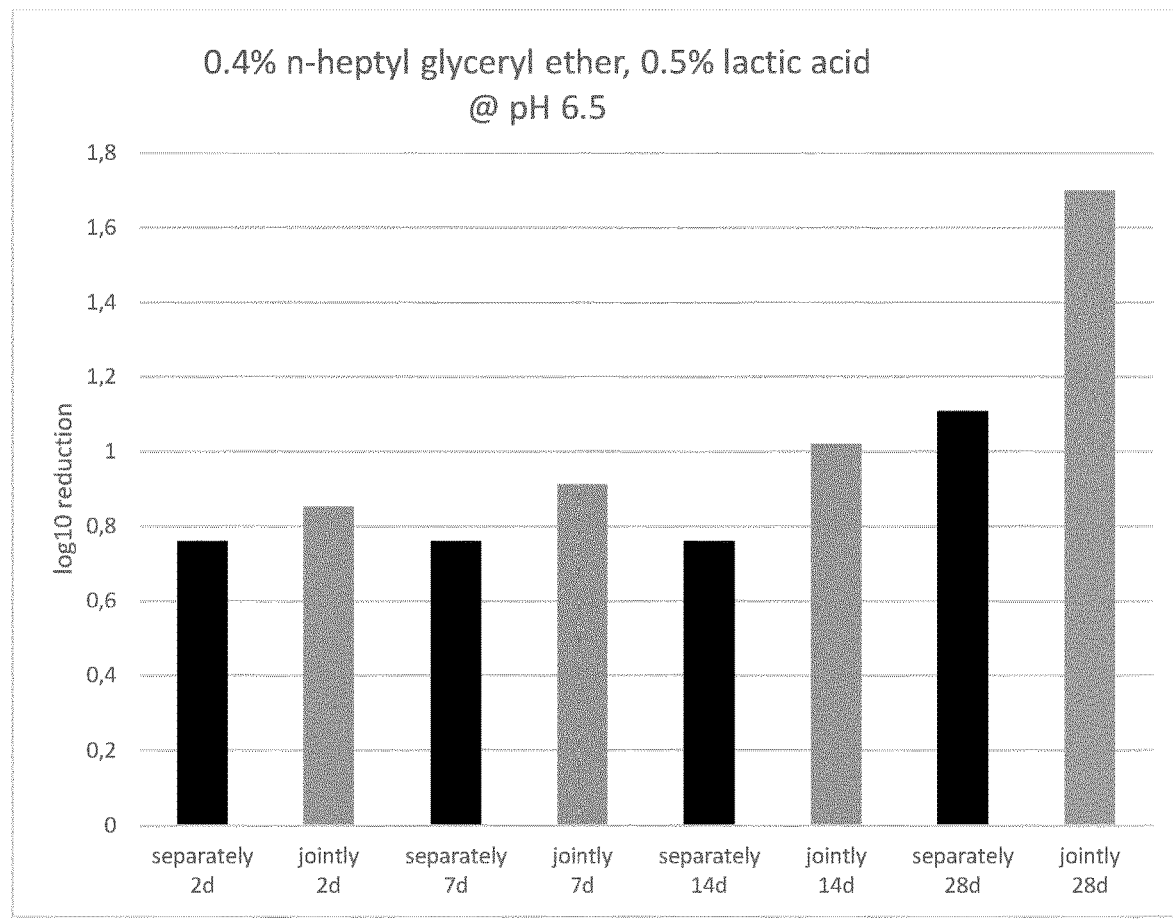
*) example according to the invention Figure 9: Synergistic antimicrobial activity of n-heptyl glyceryl ether and sodium benzoate against *A. brasiliensis* *)
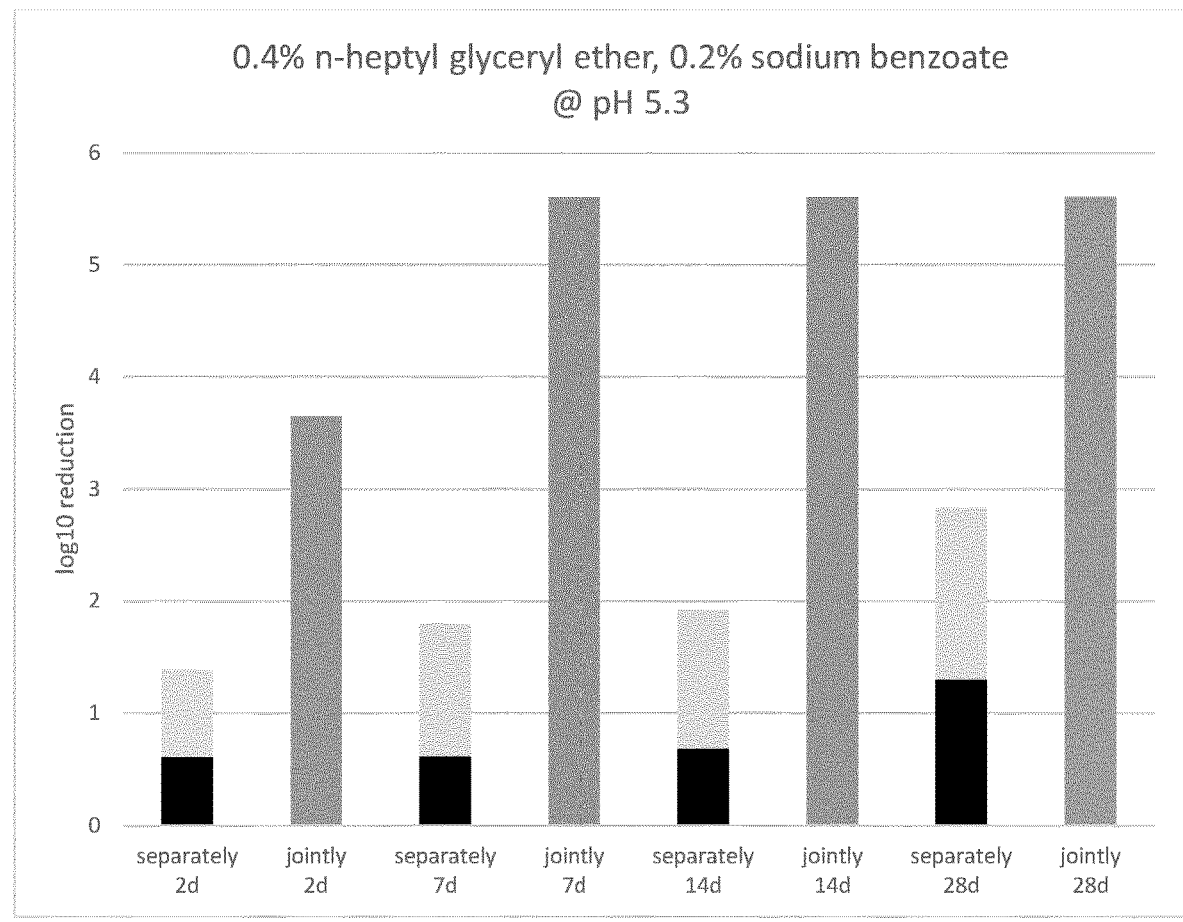
*) example according to the invention Figure 10: Synergistic antimicrobial activity of n-heptyl glyceryl ether and sodium benzoate against *A. brasiliensis* *)
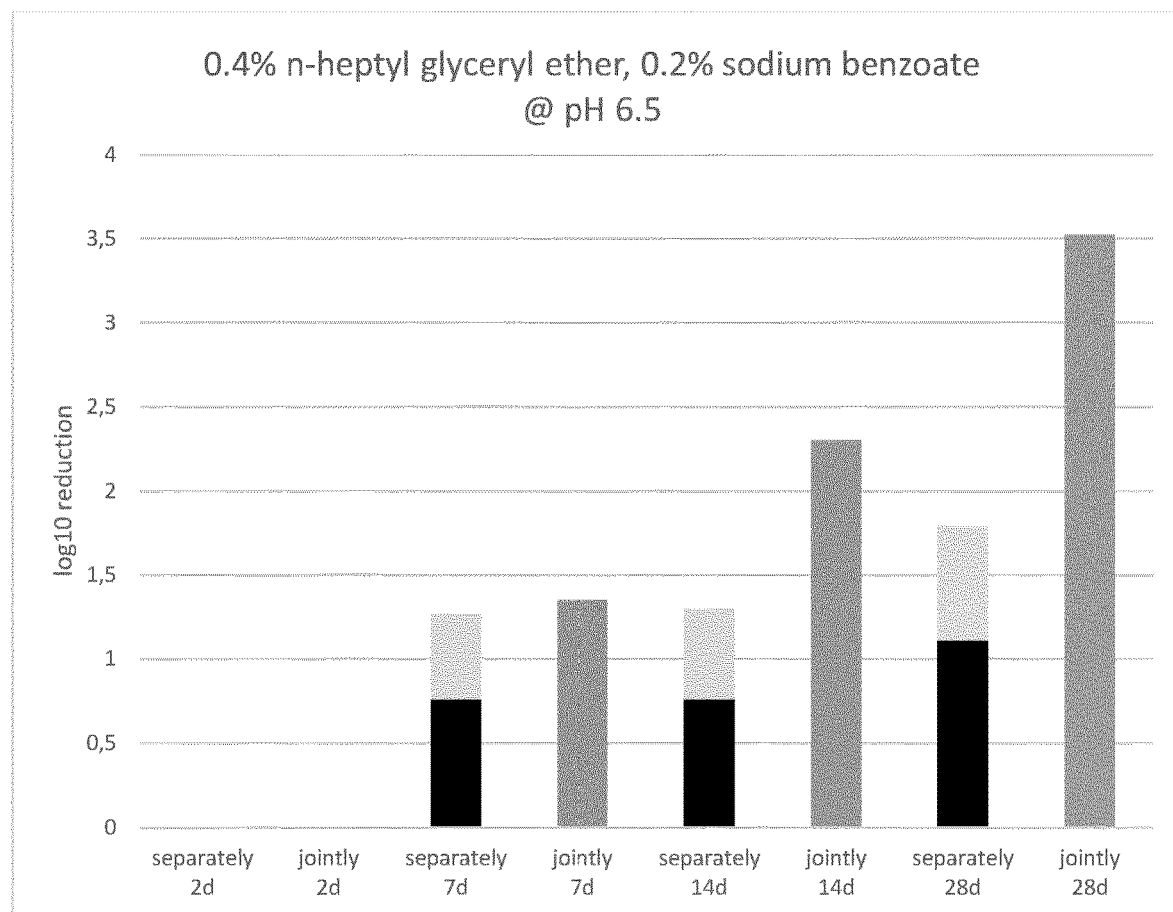
*) example according to the invention Figure 11: Antimicrobial activity of ethylhexylglycerin and p-anisic acid against A. brasiliensis \*\*)
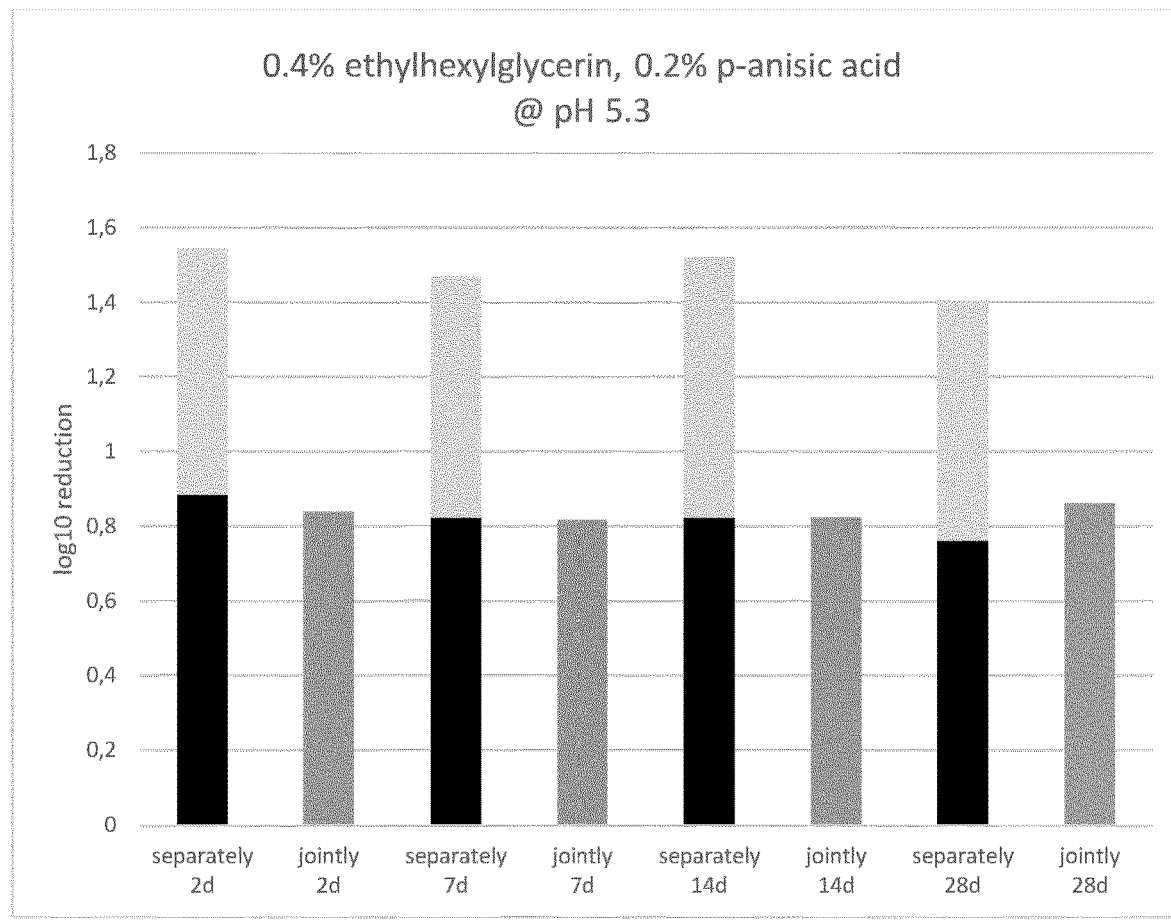
\*\*) example not according to the invention

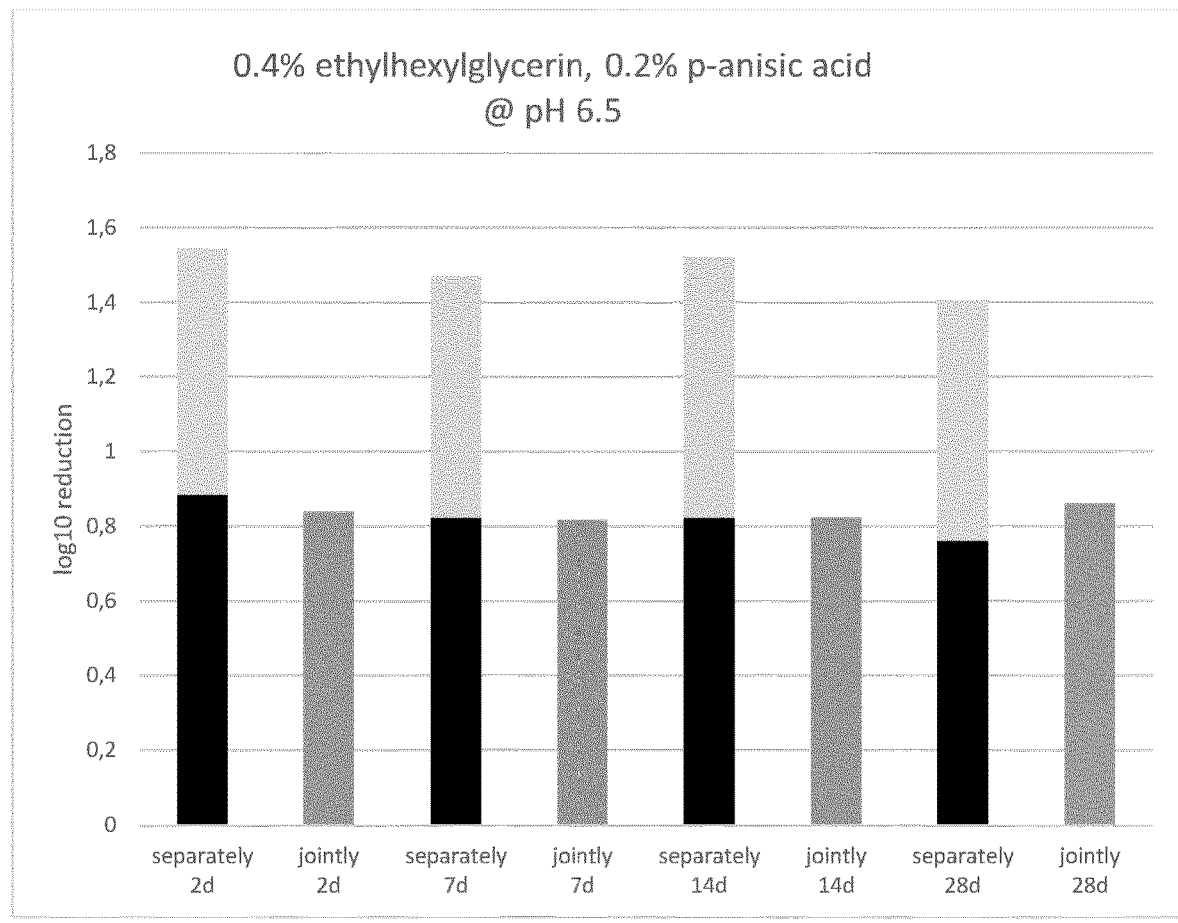
Figure 12: Antimicrobial activity of ethylhexylglycerin and p-anisic acid against A. brasiliensis **)
) example not according to the invention Figure 13: Synergistic antimicrobial activity of n-heptyl glyceryl ether and p-anisic acid against S. aureus** *)
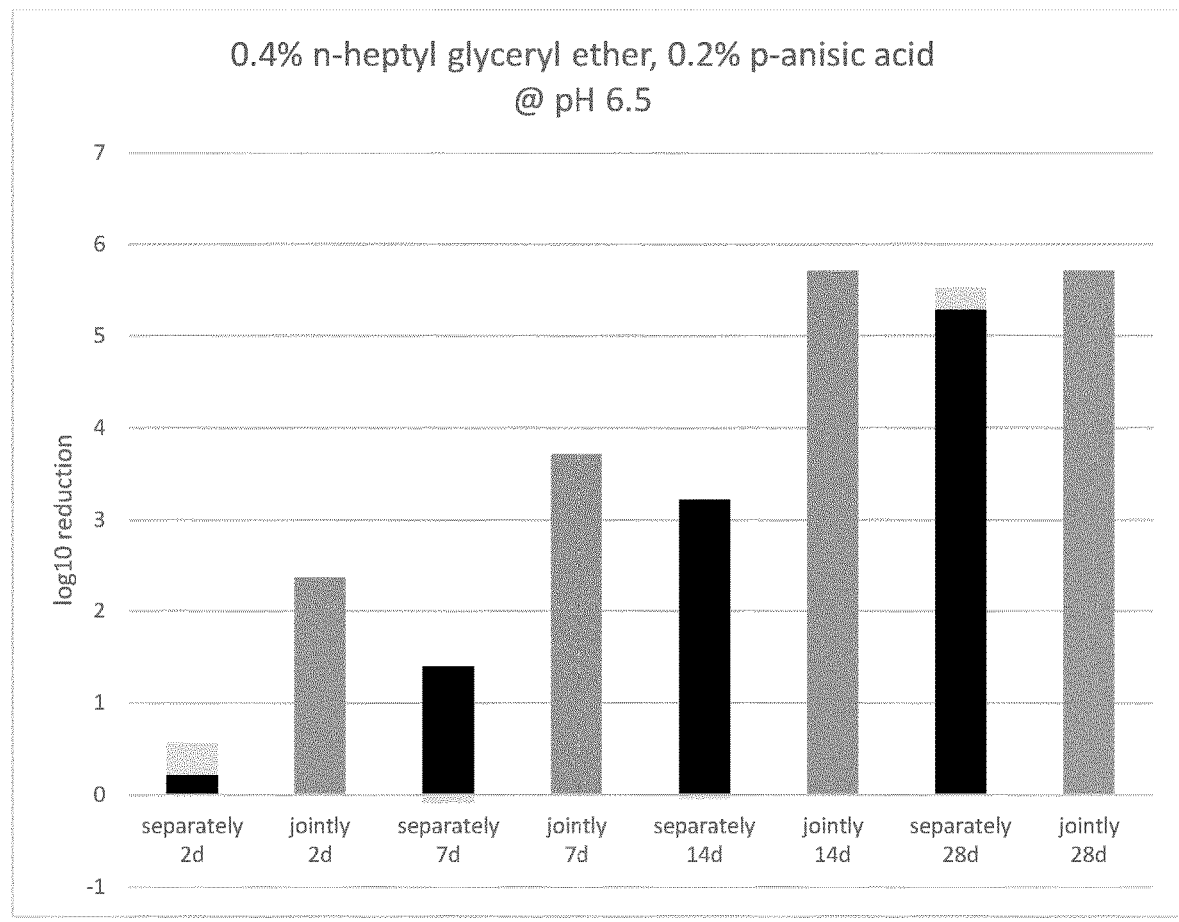
*) example according to the invention Figure 14: Synergistic antimicrobial activity of n-heptyl glyceryl ether and sorbic acid against S. aureus *)
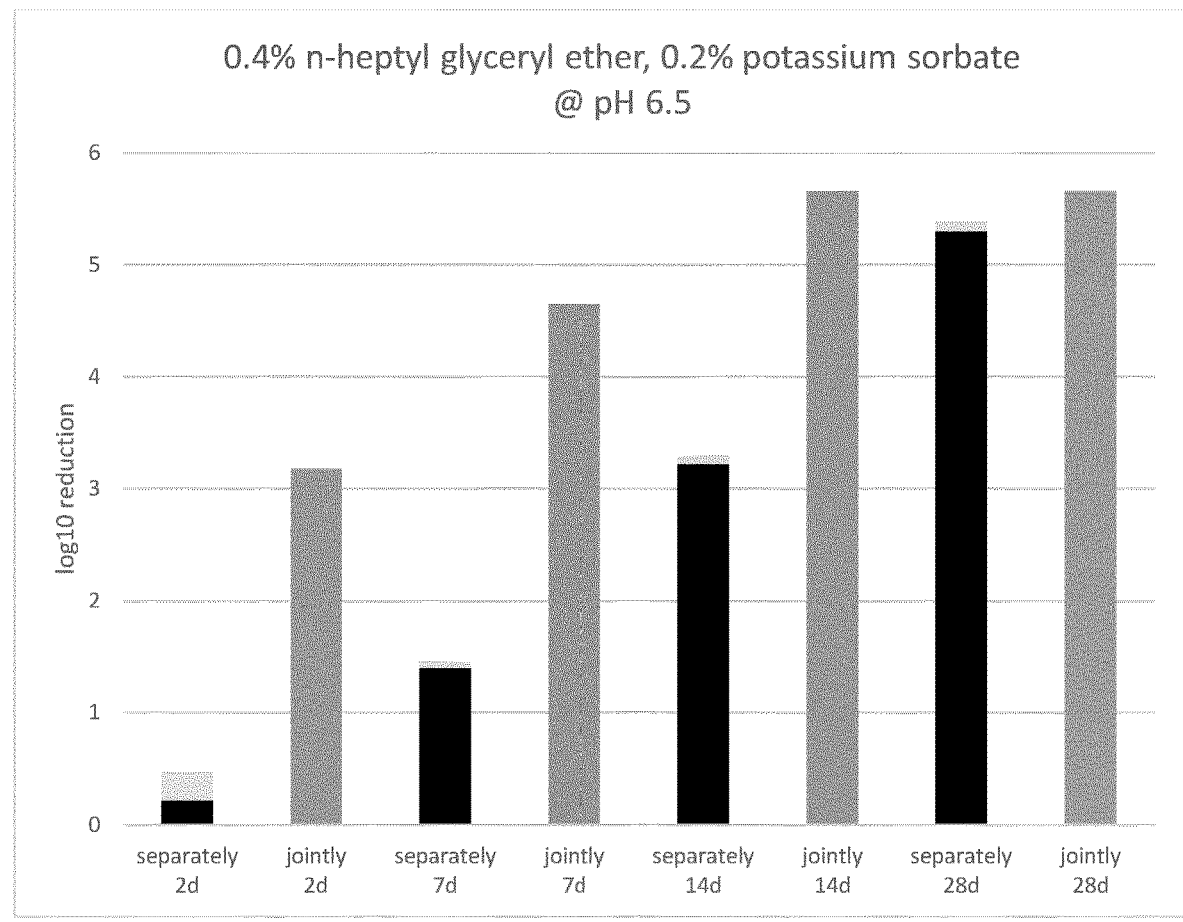
*) example according to the invention Figure 15: Synergistic antimicrobial activity of n-heptyl glyceryl ether and phenyl propanol against *S. aureus* *)
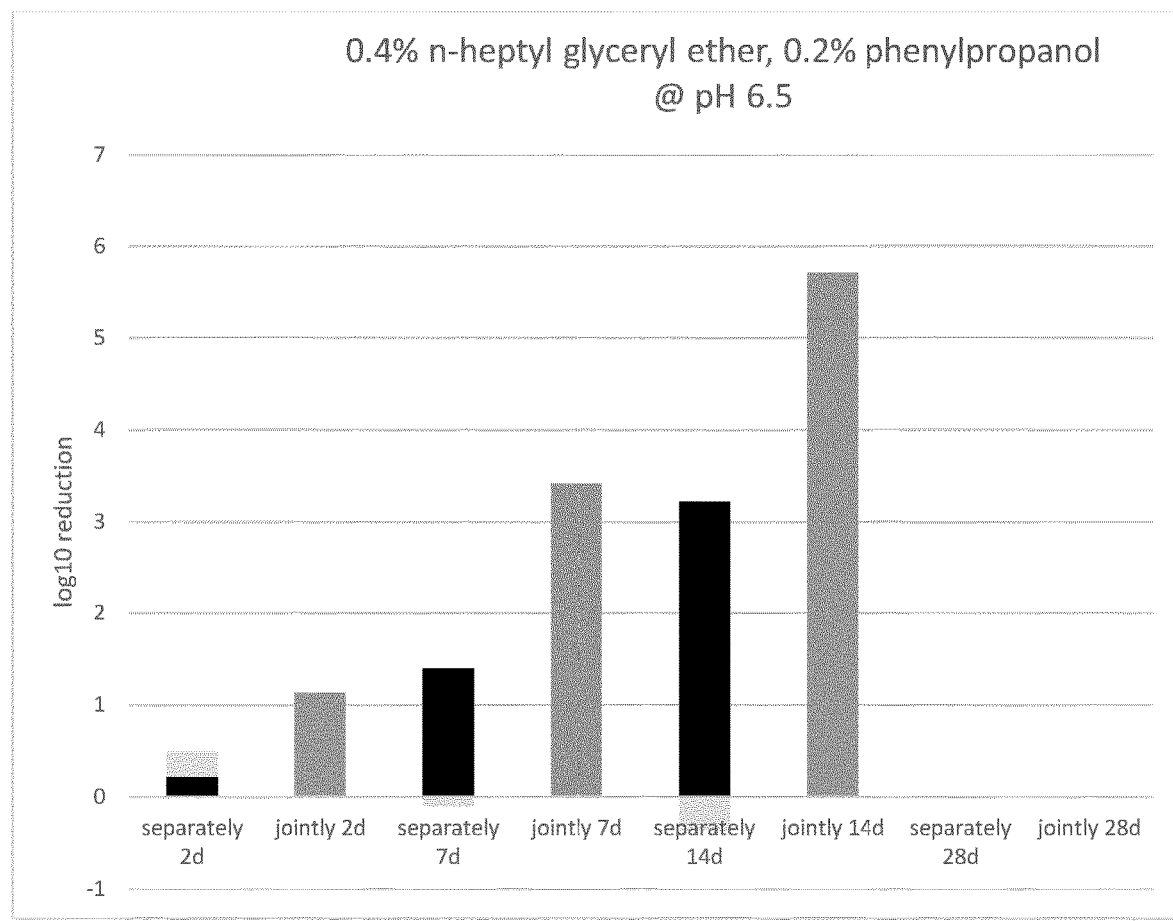
*) example according to the invention Figure 16: Synergistic antimicrobial activity of n-heptyl glyceryl ether and lactic acid against *S. aureus* *)
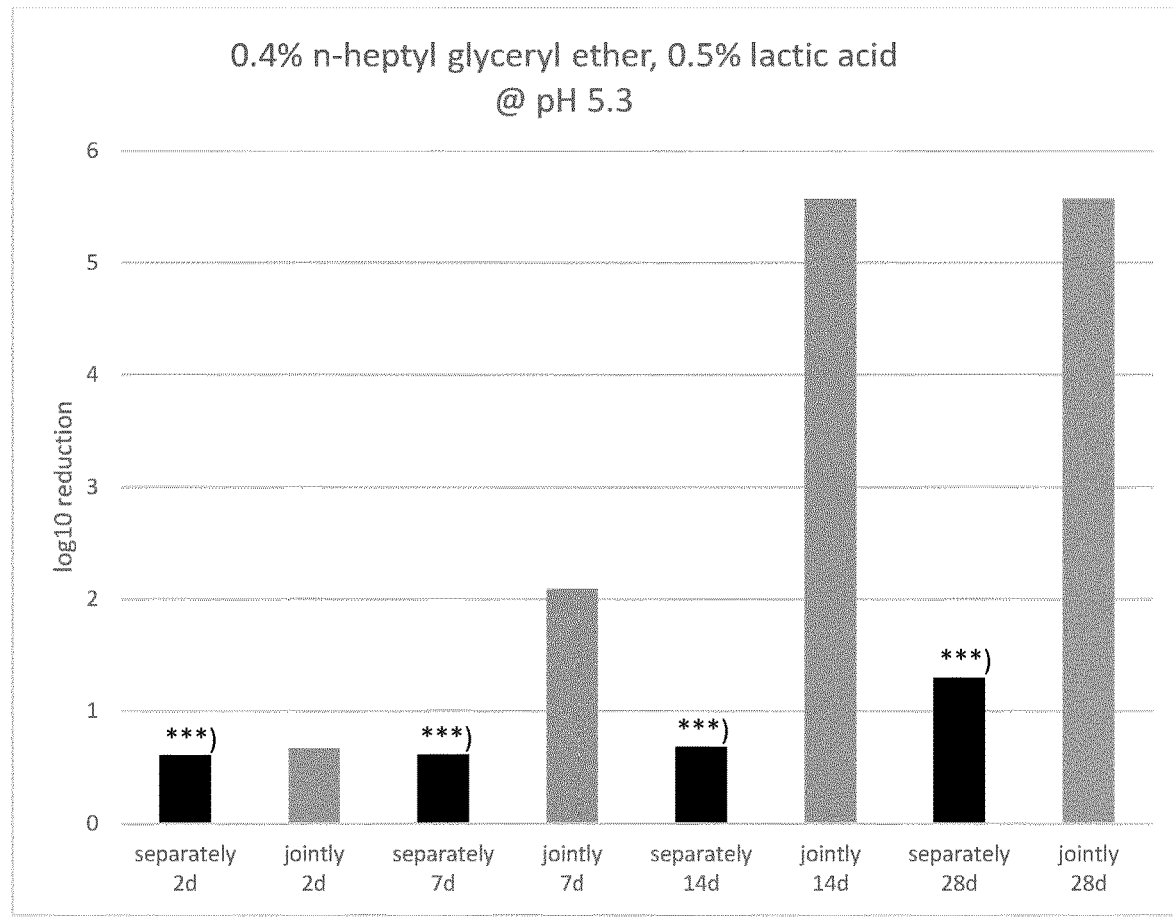
*) example according to the invention
***) no log reduction for lactic acid separately Figure 17: Synergistic antimicrobial activity of n-heptyl glyceryl ether and sodium benzoate against *S. aureus* *)
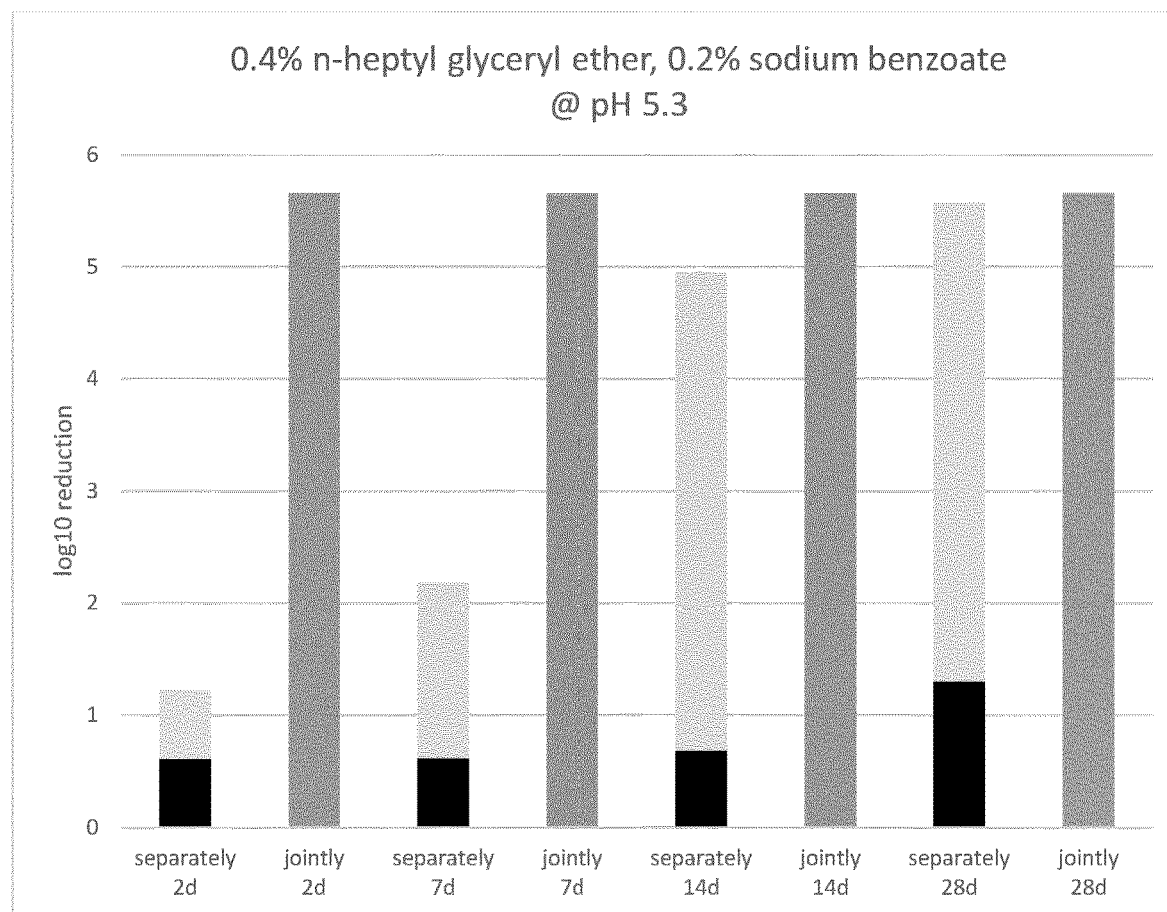
*) example according to the invention Figure 18: Synergistic antimicrobial activity of n-heptyl glyceryl ether and sodium benzoate against *S. aureus* *)
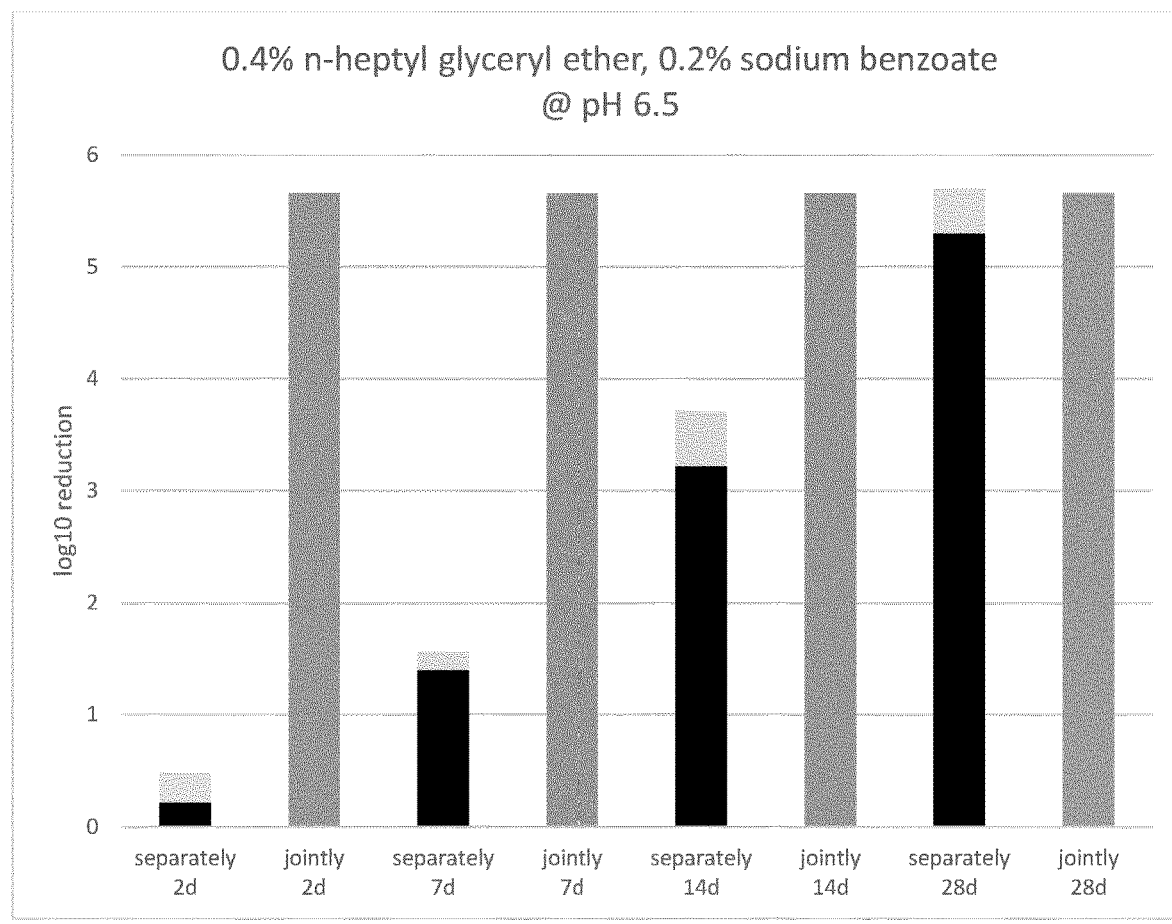
*) example according to the invention

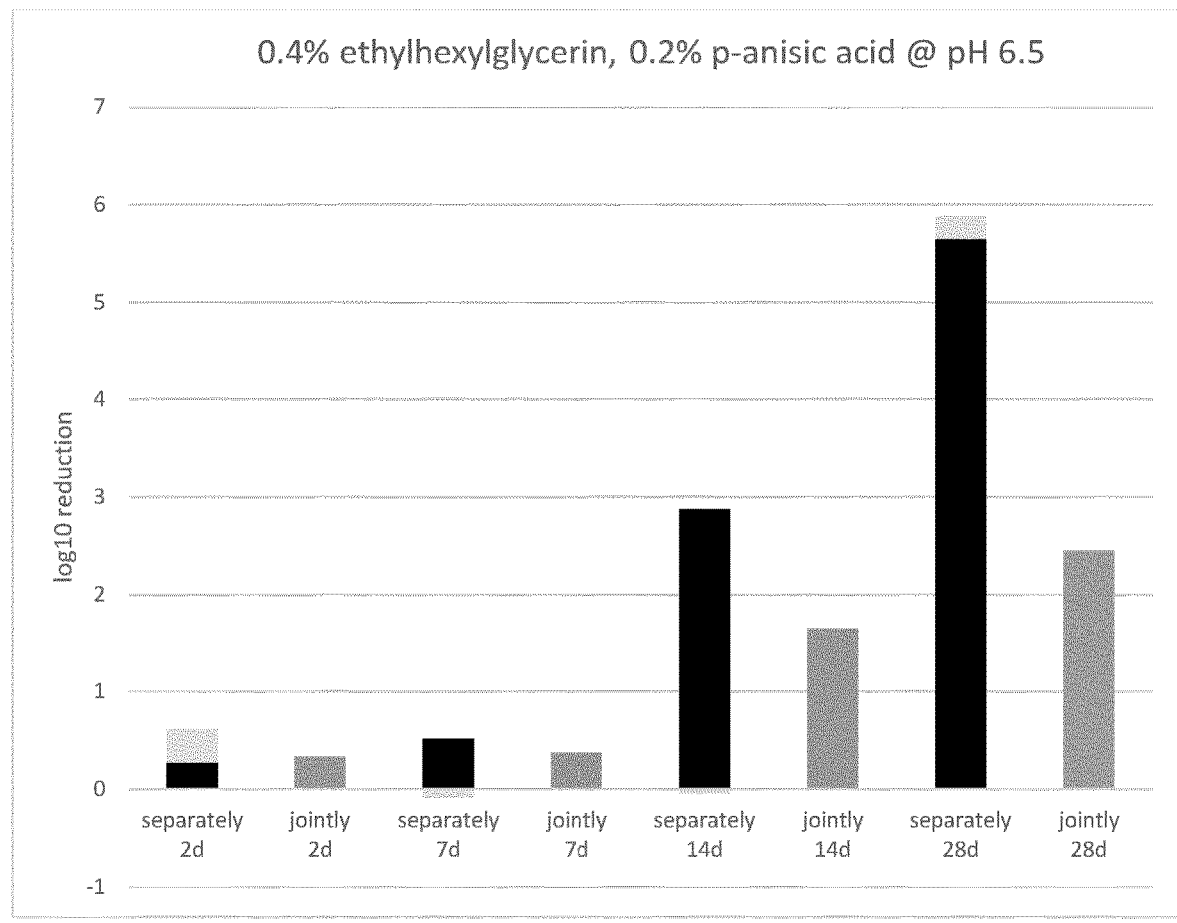
Figure 19: Antimicrobial activity of ethylhexylglycerin and p-anisic acid against S. aureus **)
**) example not according to the invention Figure 20: Synergistic antimicrobial activity of n-heptyl glyceryl ether and p-anisic acid against *C. albicans* *)
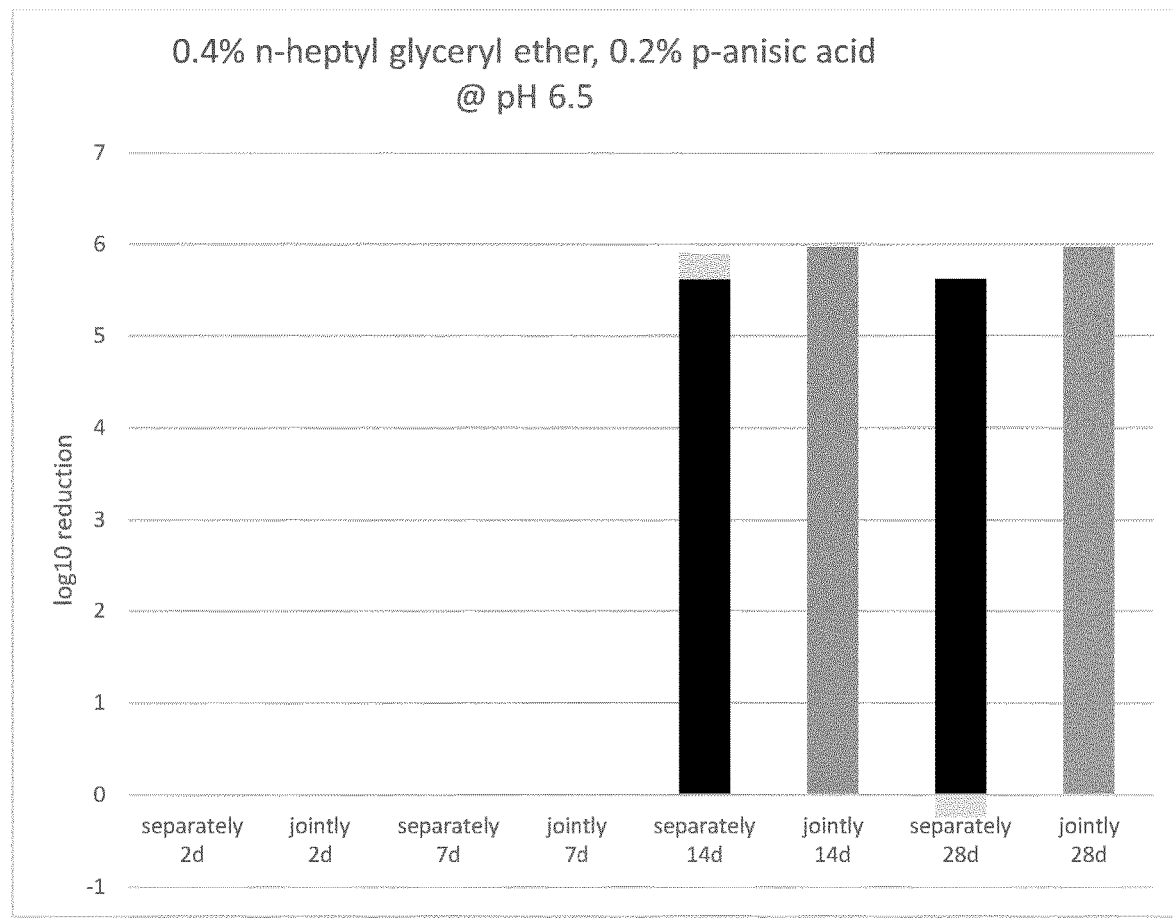
*) example according to the invention Figure 21: Synergistic antimicrobial activity of n-heptyl glyceryl ether and sorbic acid against C. albicans *)
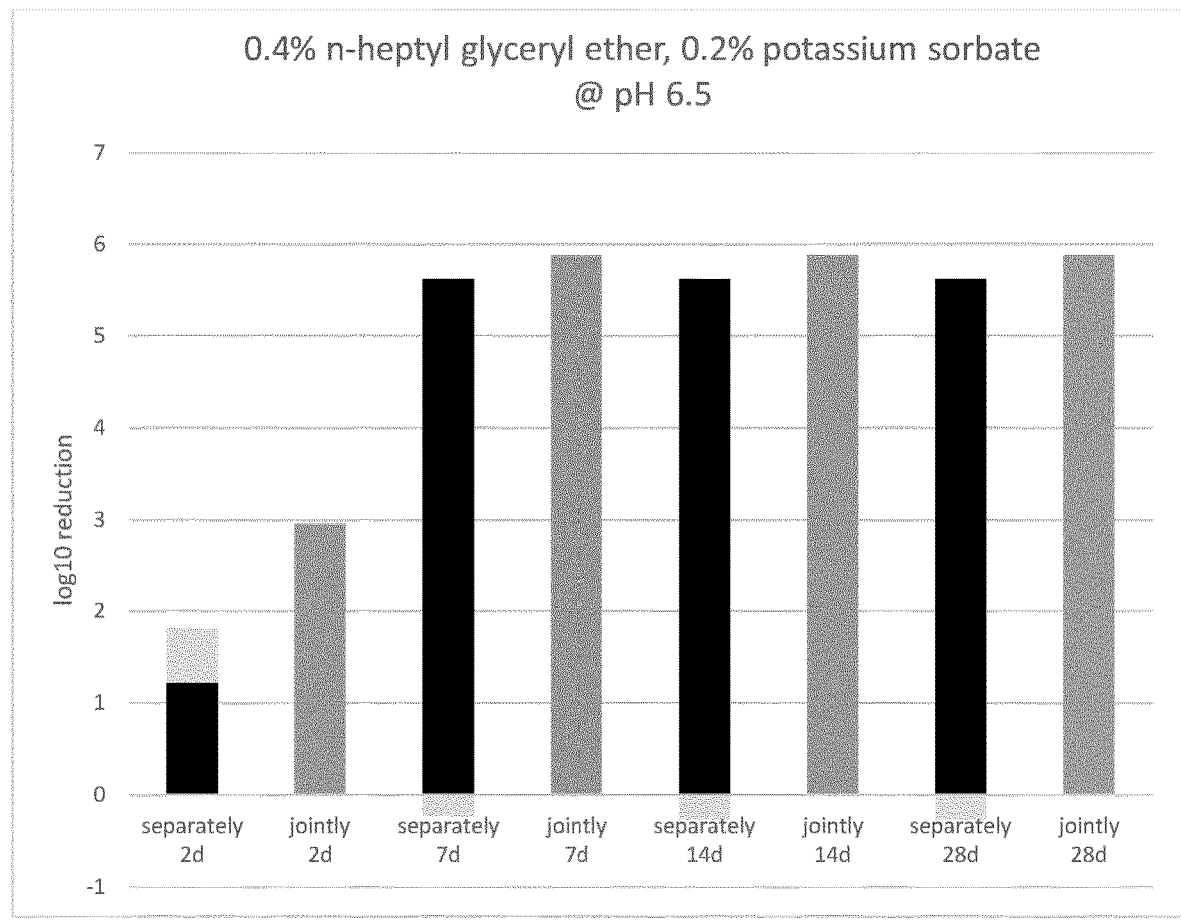
*) example according to the invention Figure 22: Synergistic antimicrobial activity of n-heptyl glyceryl ether and phenyl propanol against *C. albicans* *)
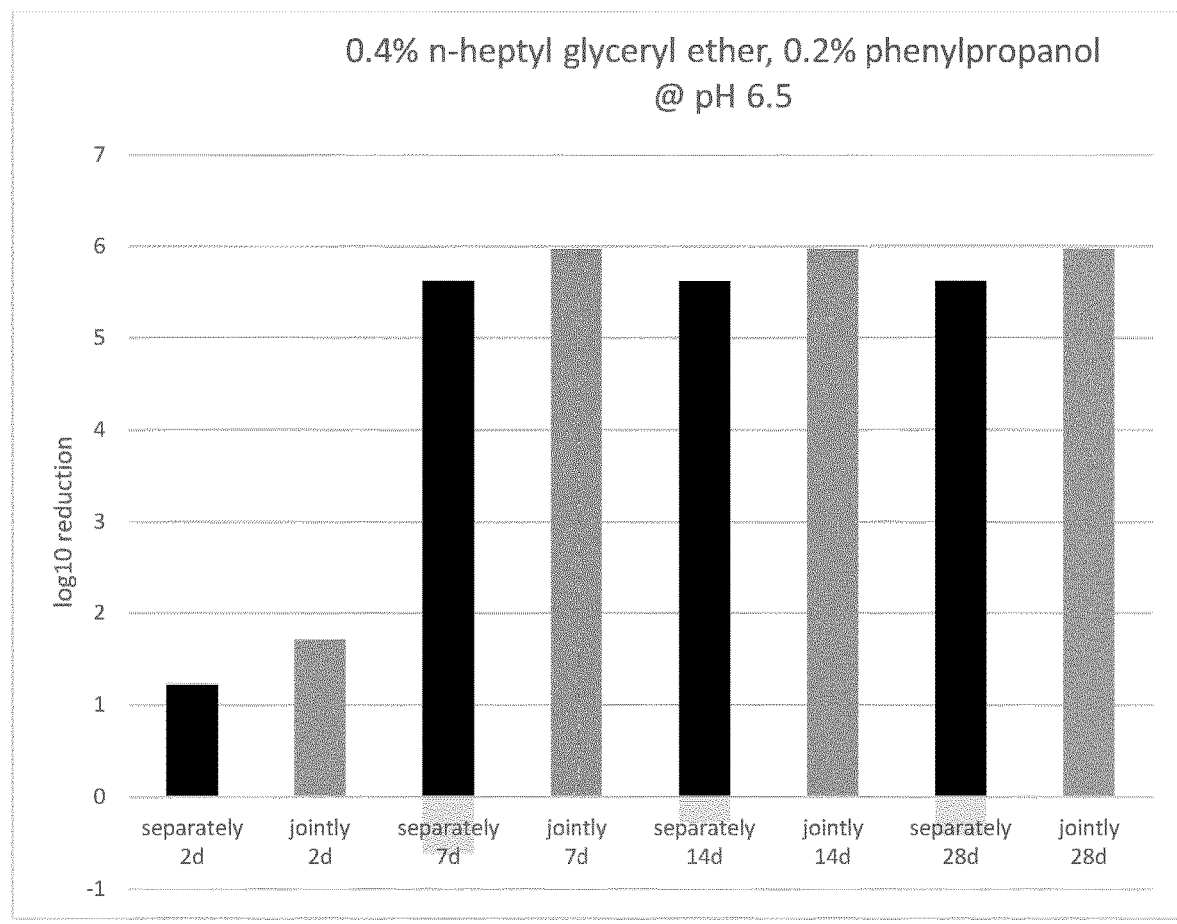
*) example according to the invention Figure 23: Synergistic antimicrobial activity of n-heptyl glyceryl ether and lactic acid against C. albicans *)
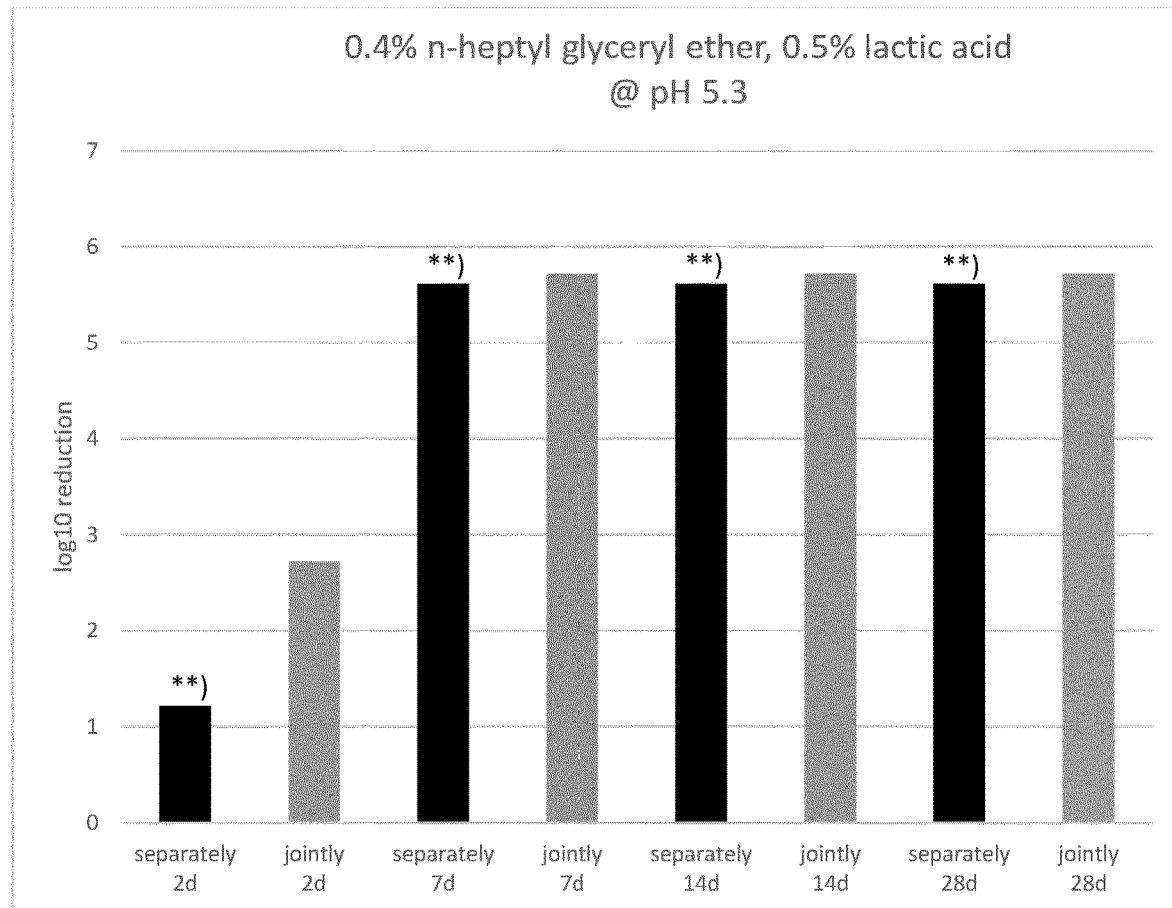
*) example according to the invention
) no log reduction for lactic acid separately Figure 24: Synergistic antimicrobial activity of n-heptyl glyceryl ether and lactic acid against C. albicans** *)
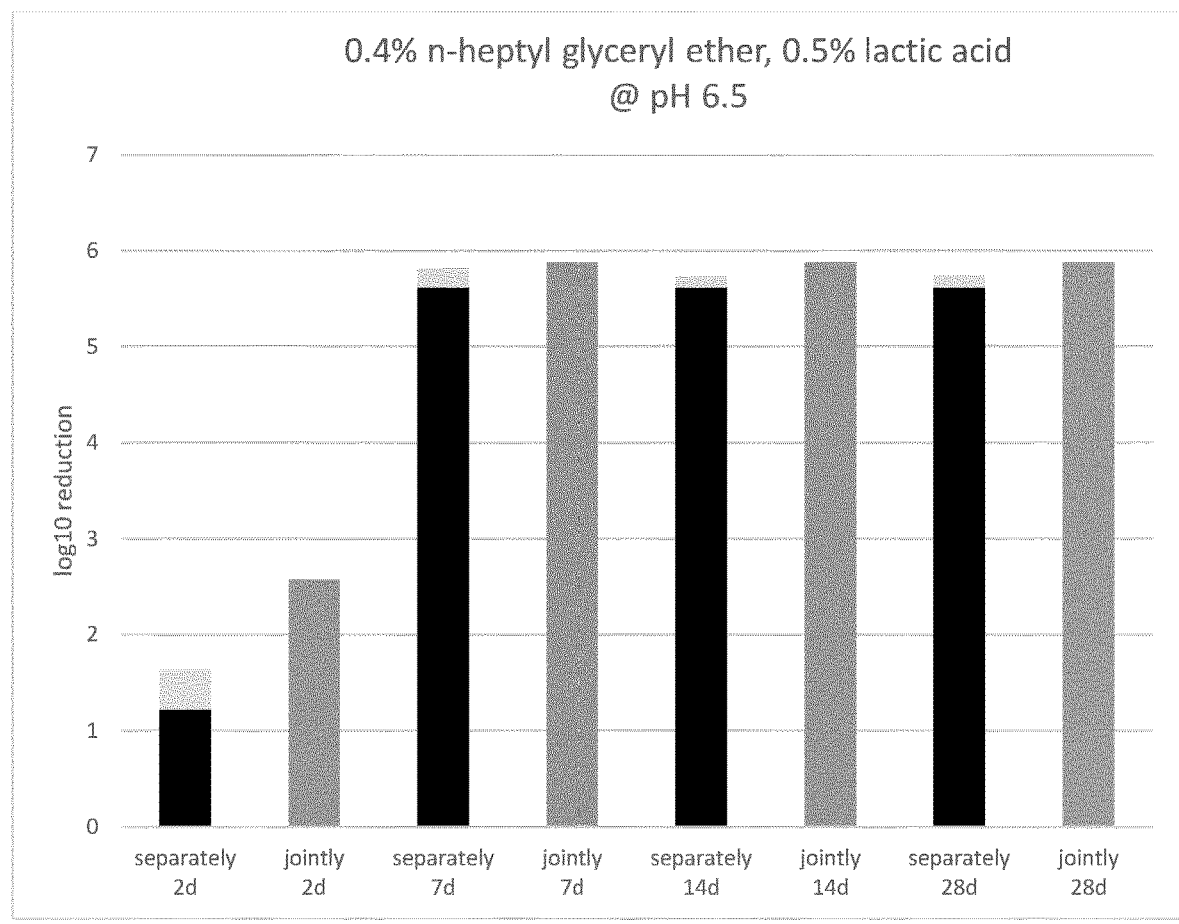
*) example according to the invention Figure 25: Antimicrobial activity of ethylhexyl glyceryl ether and p-anisic acid against *C. albicans* \*\*)
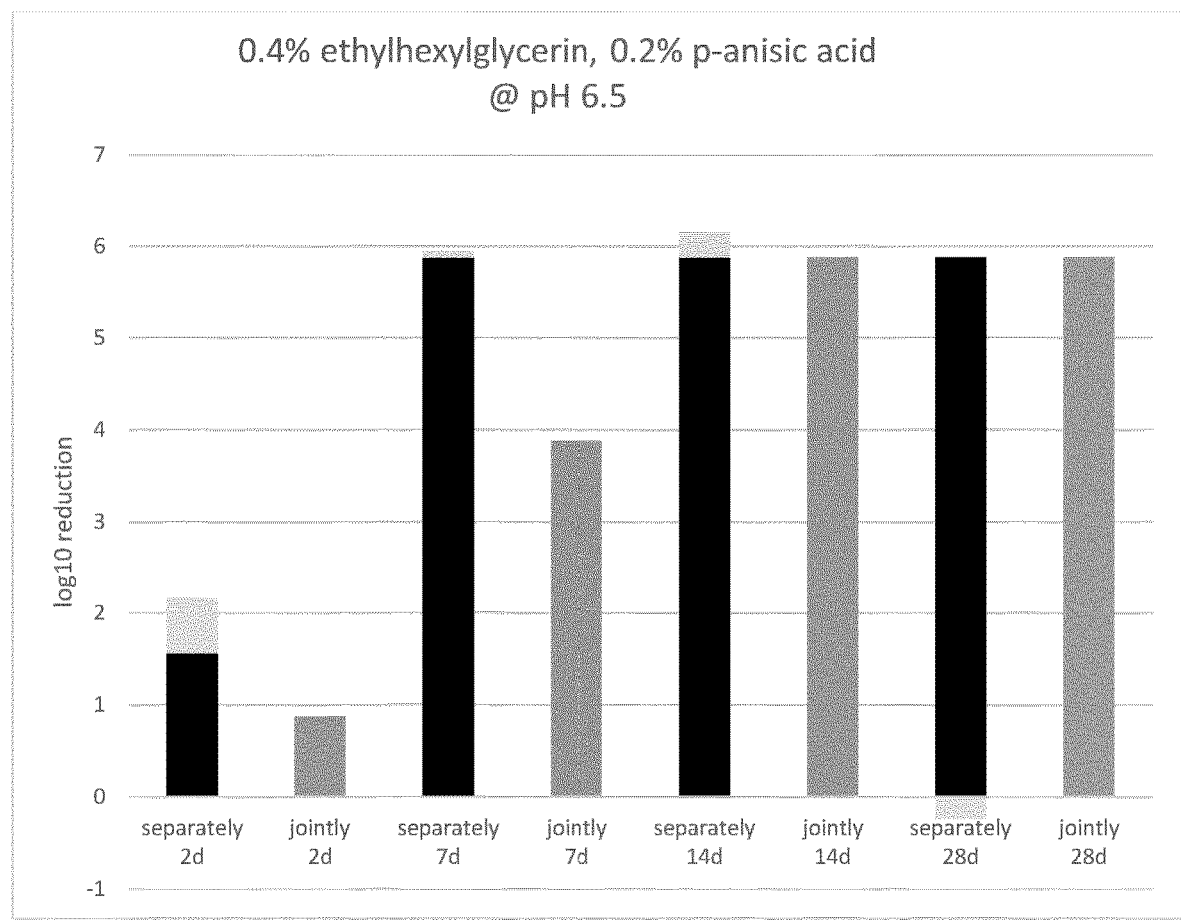
\*\*) example not according to the invention

*Figure 26: Emulsions under the light microscope with 400-fold microscope magnification [10x (ocular) * 40x (lense)]*
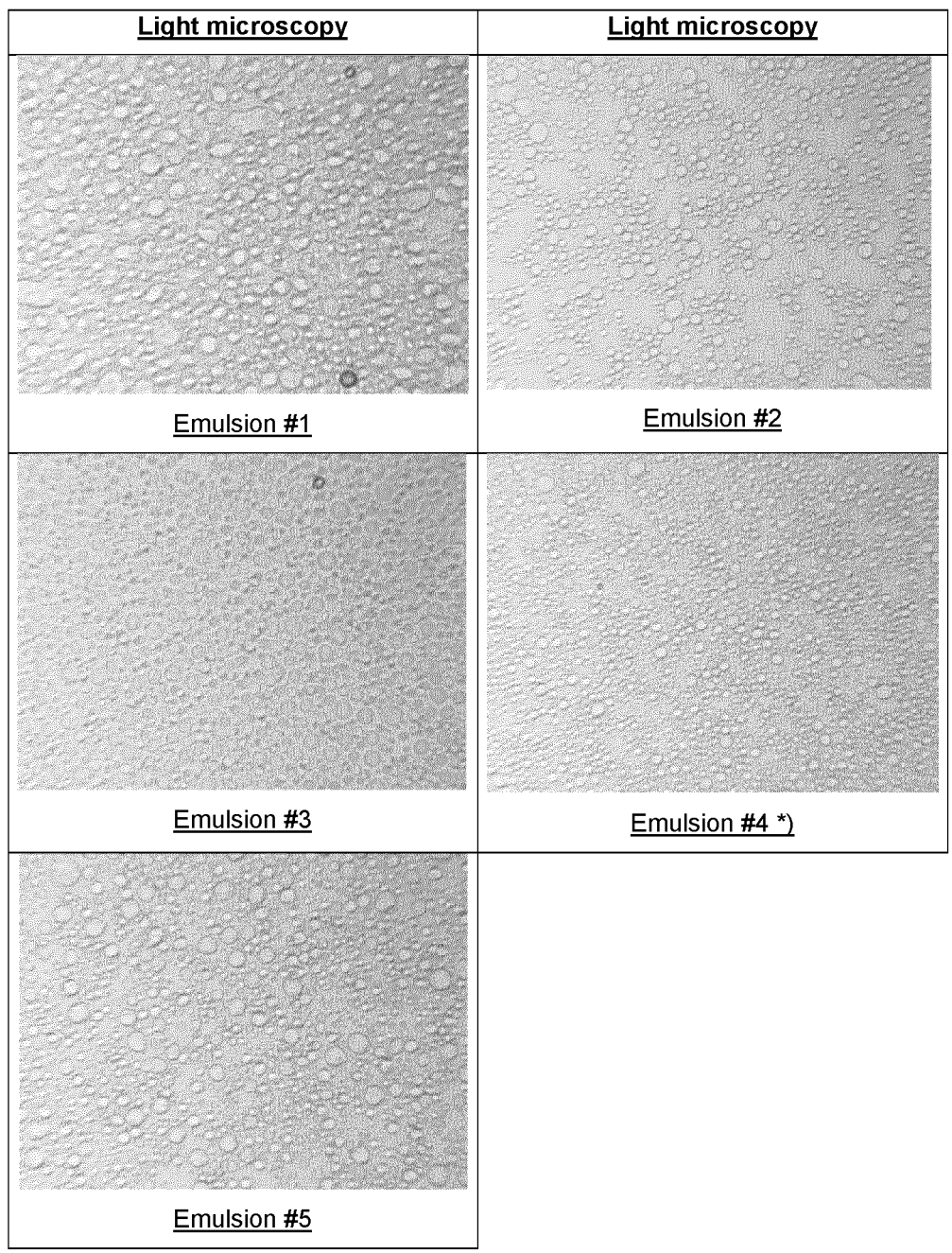

N-HEPTYL-GLYCERYL ETHER AND SYNERGISTICALLY ACTIVE PRESERVATIVES

CROSS-REFERENCE TO RELATED APPLICATIONS

This application is the National Stage entry under § 371 of International Application No. PCT/EP2021/085425, filed on Dec. 13, 2021, and which claims the benefit of priority to European Application No. 20214820.1, filed on Dec. 17, 2020. The content of each of these applications is hereby incorporated by reference in its entirety.

BACKGROUND OF THE INVENTION

Field of the Invention

The invention relates to compositions comprising n-heptyl-glyceryl ether and at least one further, carefully chosen and synergistically active preservative.

Description of Related Art

EP1369471 discloses cooling lubricants in the form of a cooling lubricant concentrate or cooling lubricant solution, comprising a cooling lubricant base based on mineral oil and/or synthetic oil and preservative comprising one or more 1- or 2-(C 3 to C 24 alkyl) glyceryl ethers.

EP0747047 discloses a composition, characterized in that it comprises at least one compound with antimicrobial activity chosen from hydrolipids or lipids and at least one glycerol monoalkyl ether. The writ discloses glycerol monoalkyl ethers as weak antifungals and gram positive antibacterials.

WO2014191258A2 discloses an antimicrobial agent comprising at least one glycerylether of formula (i)

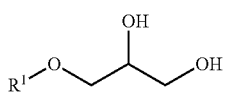

(i)

in which R¹ represents a benzyl, methylbenzyl, phenylethyl or phenylpropyl radical, or a glycerylether of formula (ii)

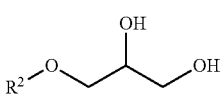

(ii)

in which R² stands for a linear or branched alkyl radical having 2 to 12 carbon atoms, on condition that in case of glycerylether of formula (II) two or three of said species are present.

SUMMARY OF THE INVENTION

It is an object of the invention to provide for new preservatives that fulfill the complex profile of preservatives to be used in cosmetics, and that are particularly active at low concentrations against a variety of different microorganisms and on top of that are able to stabilize the emulsion.

It was found that, surprisingly, certain combinations of n-heptyl glyceryl ether with other preservatives show a true synergistic efficiency in antimicrobial activity, so that very low overall concentrations of preservatives can be achieved in formulations.

The present invention therefore provides compositions comprising n-heptyl-glyceryl ether and at least one further, carefully chosen and synergistically active preservative.

The invention further provides a method for preserving a formulation and the use of the compositions according to the invention as a preservative.

An advantage of the antimicrobial compositions according to the invention is their low usage level. A further advantage of the compositions according to the invention compared to the individual components is that they improve emulsifiability and lead to emulsions of particularly fine droplet size and particularly good skin feel.

Further advantages of the compositions according to the invention are that they reduce tackiness and lead to a less waxy skin feel of cosmetic formulations, especially emulsions.

Further advantages of the compositions according to the invention are that they led to emulsions with improved softness and silkiness and a smoother skin feel.

Further advantages of the compositions according to the invention are that they improve the spreadability and reduce the whitening effect of cosmetic emulsions compared to the individual components.

A further advantage of the compositions according to the invention is that they have better processability than the individual components. Under the same boundary conditions, the compositions according to the invention can be homogeneously incorporated into cosmetic formulations more quickly than the individual components under the same boundary conditions.

Further advantages of the compositions according to the invention are their low impact on the viscosity of cosmetic formulations and their broad pH application range.

A further advantage of the compositions according to the invention is that they improve foam quality and creaminess of cosmetic cleansing formulations while having low impact on foam kinetics.

A further advantage of the compositions according to the invention is that they improve the efficacy of antiperspirants more efficiently than the individual components.

Further, the compositions according to the invention facilitate the incorporation of perfumes, essential oils and other hydrophobic components into cosmetic formulations.

A further advantage of the compositions according to the invention is their positive impact on the stability of cosmetic emulsions.

A further advantage of the compositions according to the invention is that the solubility of component A) is increased by component B).

Unless stated otherwise, all percentages (%) given are percentages by weight.

Thus, described is a composition comprising
A) n-heptyl-glyceryl ether and
B) at least one selected from
p-anisic acid, benzoic acid, levulinic acid, sorbic acid, lactic acid, mandelic acid, salicylic acid, dehydroacetic acid, cinnamic acid, geranic acid and the salts of any of the before mentioned acids,
methylparaben, ethylparaben,
phenylpropanol, benzyl alcohol, phenethyl alcohol, phenoxyethanol, propanediol, pentylene glycol, 1,2-hexanediol, caprylyl glycol, undecyl alcohol,
methylpropanediol,
ethylhexylglycerin, n-octylglycerin,
methylchloroisothiazolinone,
triethyl citrate and
citral.

DETAILED DESCRIPTION OF THE INVENTION

Preferably the composition according to the instant invention is an antimicrobial composition. The term "antimicrobial composition" in the context of the instant invention relates to compositions, that are able to reduce the growth of microorganisms.

Preferred compositions according to the instant invention are characterized in, that they are antimicrobial compositions with an antimicrobial activity against micro-organisms selected from the group of yeast, mould and bacteria, especially gram-positive and gram-negative bacteria, with *A. brasiliensis, S. aureus* and *C. albicans* being most preferred.

Preferred compositions according to the instant invention are characterized in, that component B) is selected from p-anisic acid, benzoic acid, levulinic acid, sorbic acid, lactic acid, mandelic acid, salicylic acid, dehydroacetic acid, cinnamic acid, geranic acid and the salts of any of the before mentioned acids.

More preferred compositions according to the instant invention are characterized in, that component B) is selected from
p-anisic acid, sorbic acid, benzoic acid, levulinic acid, lactic acid and the salts of any of the before mentioned acids, benzylalcohol and phenylpropanol.

Most preferred compositions according to the instant invention are characterized in, that component B) is selected from
p-anisic acid, sorbic acid, benzoic acid, lactic acid and the salts of any of the before mentioned acids, and phenylpropanol.

Preferred compositions according to the instant invention are characterized in, that component A) and component B) are comprised in a weight ratio of from 99:1 to 1:99, preferably from 80:20 to 20:80, more preferably from 70:30 to 30:70.

Preferred compositions according to the instant invention are characterized in, that component A) is comprised in an amount of from 0.005 wt.-% to 99.0 wt.-%, preferably from 0.01 wt.-% to 50.0 wt.-%, more preferably from 0.05 wt.-% to 35.0 wt.-%, most preferably from 1.0 wt.-% to 20.0 wt.-%, wherein the weight percentages refer to the total composition.

Preferred compositions according to the instant invention are characterized in, that component B) is comprised in an amount of from 0.005 wt.-% to 99.0 wt.-%, preferably from 0.01 wt.-% to 50.0 wt.-%, more preferably from 0.05 wt.-% to 35.0 wt.-%, most preferably from 1.0 wt.-% to 20.0 wt.-%, wherein the weight percentages refer to the total composition.

It is preferred according to the instant invention, that the composition according to the invention is characterized in, that it has a pH in the range of 4.0 to 8.5, preferably 4.5 to 7.5, particularly preferably 5.5 to 6.9, alternatively particularly preferably 4.0 to 5.4.

Alternatively preferred compositions according to the instant invention are characterized in, that component A) is comprised in an amount of from 1.0 wt.-% to 35.0 wt.-%, preferably from 5.0 wt.-% to 25.0 wt.-%, wherein the weight percentages refer to the total composition, and have a pH in the range of 4.0 to 11.0, preferably 7.0 to 10.0, particularly preferably 7.5 to 9.0. These alternatively preferred compositions according to the instant invention have an outstanding high critical micelle concentration of component A).

The "pH" in connection with the present invention is defined as the value which is measured for the relevant composition at 25° C. after stirring for five minutes using a pH electrode calibrated in accordance with ISO 4319 (1977).

The compositions according to the instant invention with their outstanding antimicrobial profile can be advantageously used in all kind of technical applications to preserve formulations across all possible industrial fields.

Preferred compositions according to the invention thus are formulations of different technical fields. These formulations can be, for example, cleaning formulations (e.g. for industry, household, or personal care), defoamers, coating formulations (e.g. for textiles, non-wovens or hard surfaces) and cosmetic formulations, the latter ones being preferred.

The formulations according to the instant invention can further comprise at least one additional component selected from the group of
emollients,
emulsifiers,
thickeners/viscosity regulators/stabilizers,
UV light protection filters,
hydrotropes (or polyols),
solids and fillers,
film formers,
pearlescence additives,
deodorant and antiperspirant active ingredients,
insect repellents,
self-tanning agents,
preservatives,
conditioning agents,
perfumes,
dyes,
odor absorbers,
cosmetic active ingredients,
care additives,
superfatting agents,
solvents.

Substances which can be used as exemplary representatives of the individual groups are known to those skilled in the art and can be found for example in German application DE 102008001788.4. This patent application is hereby incorporated as reference and thus forms part of the disclosure. As regards further optional components and the amounts used of these components, reference is made expressly to the relevant handbooks known to those skilled in the art, for example K. Schrader, "Grundlagen und Rezepturen der Kosmetika [Cosmetics—fundamentals and formulations]", 2nd edition, pages 329 to 341, Hüthig Buch Verlag Heidelberg.

The amounts of the particular additives are determined by the intended use.

Typical boundary formulations for the respective applications are known prior art and are contained for example in the brochures of the manufacturers of the particular base and active ingredients. These existing formulations can generally be adopted unchanged. However, if required, for adjustment and optimization, the desired modifications can be undertaken by simple tests without complication.

In a final formulation according to the instant invention, that for example is used by an end-customer, the concentration of the components is usually lower than above.

Preferred formulations according to the instant invention are characterized in, that component A) is comprised in an amount of from 0.005 wt.-% to 10.0 wt.-%, preferably from 0.01 wt.-% to 15.0 wt.-%, more preferably from 0.05 wt.-% to 6.0 wt.-%, wherein the weight percentages refer to the total formulation.

Preferred formulations according to the instant invention are characterized in, that component B) is comprised in an amount of from 0.005 wt.-% to 30.0 wt.-%, preferably from 0.01 wt.-% to 15.0 wt.-%, more preferably from 0.05 wt.-% to 6.0 wt.-%, wherein the weight percentages refer to the total formulation.

As the components A) and B) of the instant invention have outstanding solubilization properties on deodorant and antiperspirant active ingredients, preferred compositions according to the invention comprise C) at least one selected from deodorant and antiperspirant active ingredients.

It is furthermore preferred in accordance with the invention that component C) of the composition according to the invention is selected from the group of deodorant and antiperspirant active ingredients comprising, preferably consisting of, astringents, odor-absorbing and odor-neutralizing components, preferably aluminium salts, zinc salts and aluminium-zirconium complexes. From this group, particular preference is given to those selected from basic aluminium chlorides such as aluminium chlorohydrate ("ACH") or aluminiumzirconium-glycine salts ("ZAG") and zinc ricinoleate.

Preferred compositions according to the invention are formulations characterized in, that component C) is comprised in an amount of from 0.005 wt.-% to 25.0 wt.-%, preferably from 0.01 wt.-% to 10.0 wt.-%, more preferably from 0.05 wt.-% to 6.0 wt.-%, wherein the weight percentages refer to the total formulation.

The activity of the components A) and B) of the instant invention can be advantageously boosted by antioxidants; thus, preferred compositions according to the invention comprise D) at least one selected from antioxidants.

It is furthermore preferred in accordance with the invention that component D) of the composition according to the invention is selected from the group comprising, preferably consisting of, 3,5-di-tert-butyl-4-methylphenol (BHT), 2-tert-butyl-4-hydroxyanisole, 3-tert-butyl-4-hydroxyanisol, 2,6-di-tert-butyl-p-cresol, tert-butylhydroquinone, digalloyl trioleate, propyl gallate, octyl gallate, dodecyl gallate, thioglycolic acid, sodium thioglycolate, rosmarinic acid, carnosic acid, chlorogenic acid, erythorbic acid, dexpanthenol, siderophores including the catecholates (e.g. phenolates), hydroxamic acid (e.g Desferrioxamine B; D1; D2; E; H) and carboxylates (e.g. derivatives of citric acid), cysteine and its derivatives (in particular cysteine hydrochloride and acetylcysteine), ascorbic acid and its derivatives (such as ascorbic glucoside, ascorbyl dipalmitate, ascorbyl palmitate, ascorbyl tetraisopalmitate, magnesium ascorbate, magnesium ascorbyl phosphate, tertahexyldecyl ascorbate), tocopherol (vitamin E) and its derivatives (in particular vitamin E derivatives such as vitamin E acetate, vitamin E linoleate, vitamin E nicotinate and vitamin E succinate), hesperitin, naringenin, taxifolin (epicatechin), isokuranetin, quercetin, eriodyctiol, aromadendrin, acacetin, isocutallerin, luteolin, kaempferol, apigenin, diosmetin, chrysoeriol, chrysin, galangin, limocitrin, preferably tocopherol and naringenin.

Preferred compositions according to the invention are characterized in, that component D) is comprised in an amount of from 0.001 wt.-% to 5.0 wt.-%, preferably from 0.01 wt.-% to 1.0 wt.-%, more preferably from 0.02 wr.-% to 0.5 wt.-%, most preferably from 0.05 wt.-% to 0.1 wt.-%, wherein the weight percentages refer to the total formulation.

Preferred compositions according to the invention are emulsions, preferably O/W emulsions.

Another aspect of the instant inventions is a method for preserving a formulation, preferably a cosmetic formulation, comprising step I) adding the following components to the formulation
A) n-heptyl-glyceryl ether and
B) at least one selected from
p-anisic acid, benzoic acid, levulinic acid, sorbic acid, lactic acid, mandelic acid, salicylic acid, dehydroacetic acid, cinnamic acid, geranic acid and the salts of any of the before mentioned acids, methylparaben, ethylparaben,
phenylpropanol, benzyl alcohol, phenethyl alcohol, phenoxyethanol,
propanediol, pentylene glycol, 1,2-hexanediol, caprylyl glycol, undecyl alcohol, methylpropanediol, ethylhexylglycerin, n-octylglycerin,
methylchloroisothiazolinone,
triethyl citrate and
citral.

The components added to the formulation in method step I) of the instant invention can be added at any time to the formulation, for example, in the course of preparing the formulation as such or after the formulation has nearly been finally formulated.

Preferred components added to the formulation in method step I) of the instant invention are the same preferred components as contained in the composition according to the instant invention. The same is true for the concentrations of the components.

A preferred method according to the instant invention is characterized in, that the preserving comprises growth reduction, preferably growth inhibition, of a micro-organism, preferably a micro-organism selected from the group of yeast, mould and bacteria, especially gram-positive and gram-negative bacteria, with *A. brasiliensis, S. aureus* and *C. albicans* being most preferred.

Yet another aspect of the instant inventions is the use of at least one of the compositions of the instant invention as a preservative, preferably in a cosmetic formulation.

The use according to the instant invention is preferably characterized in, that is a use as a preservative against micro-organisms selected from the group of yeast, mould and bacteria, especially gram-positive and gram-negative bacteria, with *A. brasiliensis, S. aureus* and *C. albicans* being most preferred.

Yet another aspect of the instant inventions is the use of at least one of the components B) selected from
p-anisic acid, which is the most preferred component B), benzoic acid, levulinic acid, sorbic acid, lactic acid, mandelic acid, salicylic acid, dehydroacetic acid, cinnamic acid, geranic acid and the salts of any of the before mentioned acids,
methylparaben, ethylparaben,
phenylpropanol, benzyl alcohol, phenethyl alcohol, phenoxyethanol, propanediol, pentylene glycol, 1,2-hexanediol, caprylyl glycol, undecyl alcohol, methylpropanediol, ethylhexylglycerin, n-octylglycerin,
methylchloroisothiazolinone,
triethyl citrate and
citral,
for the increase of the critical micelle concentration of component A) n-heptyl-glyceryl ether in water.

Preferred components B), weight percentages, ratios, pH and the like in context with the uses of the instant invention are those named as preferred ones in context with the composition according to the instant invention.

The examples adduced hereinafter describe the present invention by way of example, without any intention that the invention, the scope of the application of which is apparent from the entirety of the description, be restricted to the embodiments specified in the examples.

BRIEF DESCRIPTION OF THE DRAWINGS

FIG. 1 shows the log 10 reduction of *A. brasiliensis* for dosage of n-heptyl glyceryl ether and anisic acid, either separately or jointly, at pH 5.3 over the course of 28 days.

FIG. 2 shows the log 10 reduction of *A. brasiliensis* for dosage of n-heptyl glyceryl ether and anisic acid, either separately or jointly, at pH 6.5 over the course of 28 days.

FIG. 3 shows the log 10 reduction of *A. brasiliensis* for dosage of n-heptyl glyceryl ether and anisic acid, either separately or jointly, at different pH values over the course of 28 days.

FIG. 4 shows the log 10 reduction of *A. brasiliensis* for dosage of n-heptyl glyceryl ether and sorbic acid, either separately or jointly, at pH 5.3 over the course of 28 days.

FIG. 5 shows the log 10 reduction of *A. brasiliensis* for dosage of n-heptyl glyceryl ether and sorbic acid, either separately or jointly, at pH 6.5 over the course of 28 days.

FIG. 6 shows the log 10 reduction of *A. brasiliensis* for dosage of n-heptyl glyceryl ether and phenyl propanol, either separately or jointly, at pH 6.5 after 28 days.

FIG. 7 shows the log 10 reduction of *A. brasiliensis* for dosage of n-heptyl glyceryl ether and lactic acid, either separately or jointly, at pH 5.3 over the course of 28 days.

FIG. 8 shows the log 10 reduction of *A. brasiliensis* for dosage of n-heptyl glyceryl ether and lactic acid, either separately or jointly, at pH 6.5 over the course of 28 days.

FIG. 9 shows the log 10 reduction of *A. brasiliensis* for dosage of n-heptyl glyceryl ether and sodium benzoate, either separately or jointly, at pH 5.3 over the course of 28 days.

FIG. 10 shows the log 10 reduction of *A. brasiliensis* for dosage of n-heptyl glyceryl ether and sodium benzoate, either separately or jointly, at pH 6.5 over the course of 28 days.

FIG. 11 shows the log 10 reduction of *A. brasiliensis* for dosage of ethylhexylglycerin and anisic acid, either separately or jointly, at pH 5.3 over the course of 28 days.

FIG. 12 shows the log 10 reduction of *A. brasiliensis* for dosage of ethylhexylglycerin and anisic acid, either separately or jointly, at pH 6.5 over the course of 28 days.

FIG. 13 shows the log 10 reduction of *S. aureus* for dosage of n-heptyl glyceryl ether and anisic acid, either separately or jointly, at pH 6.5 over the course of 28 days.

FIG. 14 shows the log 10 reduction of *S. aureus* for dosage of n-heptyl glyceryl ether and sorbic acid, either separately or jointly, at pH 6.5 over the course of 28 days.

FIG. 15 shows the log 10 reduction of *S. aureus* for dosage of n-heptyl glyceryl ether and phenylpropanol, either separately or jointly, at pH 6.5 over the course of 14 days.

FIG. 16 shows the log 10 reduction of *S. aureus* for dosage of n-heptyl glyceryl ether and lactic acid, either separately or jointly, at pH 5.3 over the course of 28 days.

FIG. 17 shows the log 10 reduction of *S. aureus* for dosage of n-heptyl glyceryl ether and sodium benzoate, either separately or jointly, at pH 5.3 over the course of 28 days.

FIG. 18 shows the log 10 reduction of *S. aureus* for dosage of n-heptyl glyceryl ether and sodium benzoate, either separately or jointly, at pH 6.5 over the course of 28 days.

FIG. 19 shows the log 10 reduction of *S. aureus* for dosage of ethylhexylglycerin and anisic acid, either separately or jointly, at pH 6.5 over the course of 28 days.

FIG. 20 shows the log 10 reduction of *C. albicans* for dosage of n-heptyl glyceryl ether and anisic acid, either separately or jointly, at pH 6.5 after 14 and 28 days.

FIG. 21 shows the log 10 reduction of *C. albicans* for dosage of n-heptyl glyceryl ether and sorbic acid, either separately or jointly, at pH 6.5 over the course of 28 days.

FIG. 22: shows the log 10 reduction of *C. albicans* for dosage of n-heptyl glyceryl ether and phenylpropanol, either separately or jointly, at pH 6.5 over the course of 28 days.

FIG. 23 shows the log 10 reduction of *C. albicans* for dosage of n-heptyl glyceryl ether and lactic acid, either separately or jointly, at pH 5.3 over the course of 28 days.

FIG. 24 shows the log 10 reduction of *C. albicans* for dosage of n-heptyl glyceryl ether and lactic acid, either separately or jointly, at pH 6.5 over the course of 28 days.

FIG. 25 shows the log 10 reduction of *C. albicans* for dosage of ethylhexylglycerin and anisic acid either separately or jointly, at pH 6.5 over the course of 28 days.

FIG. 26 shows the results of the evaluation of the formation and stability of emulsions

EXAMPLES

Example 1: Determination of the Synergistic Antimicrobial Activity, Basics

An O/W emulsion (base #1) was prepared as follows, and n-heptyl glyceryl ether, further antimicrobial compounds and combinations thereof were added to these bases:

TABLE 1

| Preparation of base #1 | | | | |
|---|---|---|---|---|
| Phase | Ingredient | INCI (EU) | Supplier | % |
| A | Deionised Water | Aqua | | ad 100 |
|  | dermofeel ® PA-3 | Sodium Phytate; Aqua; Alcohol | Evonik | 0.10 |
|  | Glycerin 99.5% Ph. Eur. | Glycerin | Highchem | 5.00 |
|  | Antimicrobial compound | | | tbd |

TABLE 1-continued

Preparation of base #1

| Phase | Ingredient | INCI (EU) | Supplier | % |
|---|---|---|---|---|
| A1 | Keltrol CG-RD | Xanthan Gum | CP Kelco | 0.30 |
| B | dermofeel ® GSC | Glyceryl Stearate Citrate | Evonik | 3.50 |
| | Miglyol 812 N | Caprylic/Capric Triglyceride | IOI Oleo | 6.00 |
| | Phytosqualan | Squalane | Sophim | 6.00 |
| | Sunflower Oil | Helianthus Annuus Seed Oil | diverse | 5.00 |
| | Lanette O | Cetearyl Alcohol | BASF | 2.00 |
| | dermofeel ® Toco 70 non GMO | Tocopherol; Helianthus Annuus Seed Oil | Evonik | 0.15 |
| C | n-heptyl glyceryl ether | | | tbd |

Processing:
1. Premix phase A and B separately and heat up to 78° C.
2. Add phase A1 to A under stirring and wait until everything is dissolved.
3. Add phase B to A under stirring. (Speed 6, for 30 sec.) Homogenize for 90 sec. using an Ultra Turrax.
4. Cool down using a water bath
5. Adjust pH.

The antimicrobial activity against specific microorganisms was then evaluated as follows:

Preparation of the Inoculum:

Preparatory to the test, the surface of casein soya bean digest agar for bacteria or Saboraud-dextrose agar without the addition of antibiotics for fungi is inoculated with the recently grown stock culture of each of the specified microorganisms. The bacterial cultures are inoculated at 30-35° C. for 18-24 hours, the culture of *C. albicans* at 20-25° C. for 48 hours, and the culture of *A. brasiliensis* at 20-25° C. for 1 week or until good sporulation is obtained.

Method:

To count the viable microorganisms in the inoculated products, the agar medium used for the initial cultivation of the respective microorganism is used. The test sample is inoculated with a suspension of the test organism to give an inoculum of $10^5$ to $10^6$ microorganisms per milliliter of the preparation. The volume of the suspension of inoculum does not exceed 1 percent of the volume of the product. The suspension is mixed thoroughly to ensure homogeneous distribution. The inoculated product is maintained at 20-25° C., protected from light. At zero hour and at 7, 14 and 28 days 1 ml is removed from the sample and the number of viable microorganisms is determined by plate count.

The criteria for the evaluation of the antimicrobial activity are given in the table below in terms of the log reduction in the number of viable microorganisms against the value obtained for the inoculum.

Example 2: Determination of the Synergistic Antimicrobial Activity Against the Microbial Strain *A. brasiliensis*

To determine the efficacy of the antimicrobial composition, n-heptyl glyceryl ether, another antimicrobial compound and combinations thereof were incorporated into base # as shown above. The antimicrobial activity against *A. brasiliensis* was then evaluated as described above. The antimicrobial activities are given in the figures below in terms of the log reduction in the number of viable microorganisms against the value obtained for the inoculum.

As shown in FIGS. 1 to 12 it was observed that n-heptyl glyceryl ether shows synergistic antimicrobial effects when combined with another antimicrobial component. "Synergistic" in this context means that the log 10 reduction created from the combination of n-heptyl glyceryl ether and another antimicrobial component is greater than the sum of the effects produced by the addition of the two components individually.

No such synergism was observed when ethylhexyl glycerin was combined with the same component.

Example 3: Determination of the Synergistic Antimicrobial Activity Against the Microbial Strain *S. aureus*

To determine the efficacy of the antimicrobial composition, n-heptyl glyceryl ether, another antimicrobial compound and combinations thereof were incorporated into base as shown above. The antimicrobial activity against *S. aureus* was then evaluated as described above. The antimicrobial activities are given in the figures below in terms of the log reduction in the number of viable microorganisms against the value obtained for the inoculum.

As shown in FIGS. 12 to 19 it was observed that n-heptyl glyceryl ether shows synergistic antimicrobial effects when combined with another antimicrobial component. "Synergistic" in this context means that the log 10 reduction created from the combination of n-Heptyl glyceryl ether and another antimicrobial component is greater than the sum of the effects produced by the addition of the two components individually.

No such synergism was observed when ethylhexylglycerin was combined with the same component.

Example 4: Determination of the Synergistic Antimicrobial Activity Against the Microbial Strain *C. albicans*

To determine the efficacy of the antimicrobial composition, n-heptyl glyceryl ether, another antimicrobial compound and combinations thereof were incorporated into base #1 as shown above. The antimicrobial activity against *C. albicans* was then evaluated as described above. The antimicrobial activities are given in the figures below in terms of the log reduction in the number of viable microorganisms against the value obtained for the inoculum.

As shown in FIGS. 20 to 25 it was observed that n-heptyl glyceryl ether shows synergistic antimicrobial effects when combined with another antimicrobial component. "Synergistic" in this context means that the log 10 reduction created from the combination of n-heptyl glyceryl ether and another antimicrobial component is greater than the sum of the effects produced by the addition of the two components individually.

No such synergism was observed when ethylhexylglycerin was combined with the same component.

Example 5: Evaluation of the Influence on Emulsification and Emulsion Stability

Emulsification means the formation of cosmetic emulsions by input of thermal energy and shear into a liquid two-phase system. Classical emulsions are only kinetically stabilized.

Surfactants/emulsifiers and other additives are used to stabilize emulsions e. g. by reducing the interfacial tensions and consequently, enhancing the dispersion of droplets and preventing coalescence. Another important feature affecting the stability of emulsions is the droplet size: small droplets favor the stabilization of an emulsion.

The influence of the synergistic compositions according to the invention on the formation and stability of cosmetic emulsions was evaluated in comparison to the individual components and to a composition not according to the invention by means of light microscopy and optical assessment. The following variants of O/W emulsions (base #1) were used for this evaluation and prepared as described above (see table 1)

TABLE 2 variants of base #1 used for the evaluation of the formation and stability of emulsions

| Phase | INCI (EU) | Emulsion #1 | Emulsion #2 | Emulsion #3 | Emulsion #4 *) | Emulsion #5 |
|---|---|---|---|---|---|---|
| A | Aqua | ad 100 | ad 100 | ad 100 | ad 100 | ad 100 |
|   | Sodium Phytate; Aqua; Alcohol | 0.10 | 0.10 | 0.10 | 0.10 | 0.10 |
|   | Glycerin | 5.00 | 5.00 | 5.00 | 5.00 | 5.00 |
|   | p-Anisic Acid | — | — | 0.20 | 0.20 | 0.20 |
| A1 | Xanthan Gum | 0.30 | 0.30 | 0.30 | 0.30 | 0.30 |
| B | Glyceryl Stearate Citrate | 3.50 | 3.50 | 3.50 | 3.50 | 3.50 |
|   | Caprylic/Capric Triglyceride | 6.00 | 6.00 | 6.00 | 6.00 | 6.00 |
|   | Squalane | 6.00 | 6.00 | 6.00 | 6.00 | 6.00 |
|   | Helianthus Annuus Seed Oil | 5.00 | 5.00 | 5.00 | 5.00 | 5.00 |
|   | Cetearyl Alcohol | 2.00 | 2.00 | 2.00 | 2.00 | 2.00 |
|   | Tocopherol; Helianthus Annuus Seed Oil | 0.15 | 0.15 | 0.15 | 0.15 | 0.15 |
| C | n-heptyl glyceryl ether | — | 0.40 | — | 0.40 | 0.40 |
|   | ethylhexyl glycerin | — | — | — | — | — |

*) formulation containing the composition according to the invention

As shown in FIG. 26, surprisingly, it was found that, compared to the individual components (emulsions #2 and #3) and the composition not according to the invention (emulsion #5), the composition according to the invention (emulsion #4) improves the emulsification process and leads to stable emulsions with a smaller and more homogeneous bubble size.

Example 6: Evaluation of the Influence of a Synergistic Combination of n-Heptyl Glyceryl Ether and p-Anisic Acid on the Sensory Properties of an Emulsion The sensory properties of synergistic compositions according to the invention were evaluated in comparison to the individual components and to a composition not according to the invention by means of a trained panel. Emulsions #1 to #5 (see table 2) were prepared as described above (see tables 1). A defined amount of 2.0 g of each emulsion was applied on the forearms of the panelists and different characteristics such as spreadability and gloss were evaluated on a scale of 0 (weakly pronounced) to 5 (strongly pronounced).

TABLE 3 results of the sensory evaluation
Scores of the sensory evaluation, mean values; 0 = weakly pronounced, 5 = strongly pronounced

|   | Spreadability | Gloss |
|---|---|---|
| Emulsion #1 | 2.5 | 0.75 |
| Emulsion #2 | 3.75 | 0.75 |
| Emulsion #3 | 3 | 0 |
| Emulsion #4 *) | 4 | 1 |
| Emulsion #5 | 3.75 | 0.5 |

*) formulation containing the composition according to the invention

Table 3 clearly demonstrates that the formulation containing the synergistic combination of n-heptyl glyceryl ether and p-anisic acid (emulsion #4), has better spreadability and leads to a more glossy skin compared to the emulsions containing the individual components (emulsions #2 and #3), to the emulsion containing a combination of ethylhexylglycerin and p-anisic acid (emulsion #5), and the formulation without any antimicrobial component at all (emulsion #1).

Example 7: Evaluation of the Influence of a Synergistic Combination of n-Heptyl Glyceryl Ether and Phenylpropanol on the Sensory Properties of an Emulsion Emulsions #6 to #8 (see table 4) were prepared as described above (see tables 1). A defined amount of 2.0 g of each emulsion was applied on the forearms of the panelists and different characteristics such as spreadability and gloss were evaluated on a scale of 0 (weakly pronounced) to 5 (strongly pronounced).

TABLE 4 variants of base #1 used for the evaluation of the formation and stability of emulsions

| Phase | INCI (EU) | Emulsion #6 | Emulsion #7 | Emulsion #8 | Emulsion #9 *) |
|---|---|---|---|---|---|
| A | Aqua | ad 100 | ad 100 | ad 100 | ad 100 |
|  | Sodium Phytate; Aqua; Alcohol | 0.10 | 0.10 | 0.10 | 0.10 |
|  | Glycerin | 5.00 | 5.00 | 5.00 | 5.00 |
|  | Phenylpropanol | — | — | 0.20 | 0.20 |
| A1 | Xanthan Gum | 0.30 | 0.30 | 0.30 | 0.30 |
| B | Glyceryl Stearate Citrate | 3.50 | 3.50 | 3.50 | 3.50 |
|  | Caprylic/Capric Triglyceride | 6.00 | 6.00 | 6.00 | 6.00 |
|  | Squalane | 6.00 | 6.00 | 6.00 | 6.00 |
|  | Helianthus Annuus Seed Oil | 5.00 | 5.00 | 5.00 | 5.00 |
|  | Cetearyl Alcohol | 2.00 | 2.00 | 2.00 | 2.00 |
|  | Tocopherol; Helianthus Annuus Seed Oil | 0.15 | 0.15 | 0.15 | 0.15 |
| C | n-heptyl glyceryl ether | — | 0.40 | — | 0.40 |

*) formulation containing the composition according to the invention

TABLE 5 results of the sensory evaluation
Scores of the sensory evaluation, mean values; 0 = weakly pronounced,
5 = strongly pronounced

|  | Spreadability | Gloss |
|---|---|---|
| Emulsion #6 | 3.3 | 0.7 |
| Emulsion #7 | 3 | 0.3 |
| Emulsion #8 | 3 | 0.3 |
| Emulsion #9 *) | 3.7 | 0.7 |

*) formulation containing the composition according to the invention

Table 5 clearly demonstrates that the formulation containing the synergistic combination of n-heptyl glyceryl ether phenyl propanol (emulsion #9), has better spreadability and leads to a more glossy skin compared to the emulsions containing the individual components (emulsions #7 and #8).

Example 8: Influence, of Component B) on Solubility of n-Heptyl-Glyceryl Ether

N-heptyl-glyceryl ether has a water solubility of approximately 2 g/l before micelles are forming. By the addition of component B) this critical micelle concentration (CMC) is dramatically increased as shown in table 6:

TABLE 6

Formulations without occurrence of micelles

| INCI (EU) | Formulation #10 *) | Formulation #11 *) | Formulation #12 *) | Formulation #13 *) |
|---|---|---|---|---|
| pH | 8.0 | 8.0 | 8.0 | 8.0 |
| Aqua | ad 100 | ad 100 | ad 100 | ad 100 |
| Propyleneglycol | 46 | — | — | — |
| Glycerin | — | — | — | 20 |
| n-heptyl glyceryl ether | 20 | 20 | 19.00 | 19.00 |
| Sodium anisate | 8.7 | 10 | 7.6 | 7.6 |

*) formulation containing the composition according to the invention

The invention claimed is:

1. A composition, comprising:
   A) n-heptyl-glyceryl ether, and
   B) at least one selected from the group consisting of p-anisic acid, benzoic acid, sorbic acid, lactic acid, and salts of any of the before mentioned acids,
   and phenylpropanol,
   and
   wherein the composition has a pH in the range of 4.0 to 8.5.

2. The composition according to claim 1, wherein component A) and component B) are comprised in a weight ratio of from 99:1 to 1:99.

3. The composition according to claim 1, wherein component A) is comprised in an amount of from of from 0.005 wt.-% to 99.0 wt.-%, wherein the weight percentages refer to a total composition.

4. The composition according to claim 1, wherein component B) is comprised in an amount of from 0.005 wt.-% to 99.0 wt.-%, wherein the weight percentages refer to a total composition.

5. The composition according to claim 1, wherein the composition comprises
   C) at least one selected from the group consisting of deodorant and antiperspirant active ingredients.

6. The composition according to claim 1, wherein the composition comprises
   D) at least one antioxidant.

7. A formulation, comprising the composition according to claim 1, wherein the formulation is selected from the group consisting of cleaning formulations, defoamers, coating formulations, and cosmetic formulations.

8. The formulation according to claim 7, wherein
   component A) is comprised in an amount of from of from 0.005 wt.-% to 10.0 wt.-%, and
   component B) is comprised in an amount of from 0.005 wt.-% to 30.0 wt.-%, and
   optionally, component C), which is at least one selected from the group consisting of deodorant and antiperspirant active ingredients, is comprised in an amount of from 0.005 wt.-% to 25.0 wt.-%,
wherein the weight percentages refer to a total formulation.

9. A method for preserving a formulation, the method comprising:
adding the following components to the formulation
A) n-heptyl-glyceryl ether, and
B) at least one selected from the group consisting of p-anisic acid, benzoic acid, sorbic acid, lactic acid and salts of any of the before mentioned acids,
and phenylpropanol.

10. The method according to claim 9, wherein the preserving comprises growth reduction of a micro-organism.

11. A preservative, comprising the composition according to claim 1.

12. A method for increasing critical micelle concentration of n-heptyl-glyceryl ether in water, the method comprising:
adding to the water and the n-heptyl-glyceryl ether, at least one selected from the group consisting of
B) p-anisic acid and salts thereof.

13. The composition according to claim 6, wherein the at least one antioxidant is tocopherol or naringenin.

14. The method according to claim 9, wherein the formulation is selected from the group consisting of cleaning formulations, defoamers, coating formulations, and cosmetic formulations.

15. The method according to claim 10, wherein the micro-organism is selected from the group consisting of yeast, mould, and bacteria.

16. The method according to claim 10, wherein the micro-organism is *A. brasiliensis, S. aureus*, or *C. albicans*.

17. The preservative according to claim 11, wherein the preservative is a preservative against a micro-organism selected from the group consisting of yeast, mould, and bacteria.

18. The preservative according to claim 17, wherein the preservative is a preservative against bacteria comprising *A. brasiliensis, S. aureus*, or *C. albicans*.

19. The composition according to claim 1, which has synergistic efficiency in antimicrobial activity.

20. The composition according to claim 19, wherein the antimicrobial activity is against is *A. brasiliensis, S. aureus*, or *C. albicans*.

* * * * *